(12) United States Patent
Kibler et al.

(10) Patent No.: US 11,611,578 B2
(45) Date of Patent: *Mar. 21, 2023

(54) SYSTEM AND METHOD FOR ASSESSING CYBERSECURITY RISK OF COMPUTER NETWORK

(71) Applicant: American International Group, Inc., New York, NY (US)

(72) Inventors: Philip Kibler, Whiteland, IN (US); Daniel Wilson, Firestone, CO (US); Martin Overton, West Sussex (GB); Tracie Grella, Maplewood, NJ (US); Garin Pace, Darien, CT (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/127,347

(22) Filed: Dec. 18, 2020

(65) Prior Publication Data

US 2021/0105296 A1    Apr. 8, 2021

Related U.S. Application Data

(63) Continuation of application No. 16/058,726, filed on Aug. 8, 2018, now Pat. No. 10,904,282.

(Continued)

(51) Int. Cl.
*H04L 29/00* (2006.01)
*H04L 9/40* (2022.01)
*G06F 11/30* (2006.01)

(52) U.S. Cl.
CPC ........ *H04L 63/1433* (2013.01); *G06F 11/301* (2013.01); *H04L 63/20* (2013.01)

(58) Field of Classification Search
CPC ..... H04L 63/1433; H04L 63/20; G06F 11/301
See application file for complete search history.

(56) References Cited

U.S. PATENT DOCUMENTS

| 6,574,737 B1 * | 6/2003 | Kingsford | H04L 63/1433 |
| | | | 709/224 |
| 8,788,279 B2 * | 7/2014 | Hayes | G16H 50/30 |
| | | | 705/2 |

(Continued)

OTHER PUBLICATIONS

National Institute of Standards and Technology, U.S. Department of Commerce, "Guide for Conducting Risk Assessments—Information Security," Computer Security Division Information Technology Laboratory National Institute of Standards and Technology Gaithersburg, MD 20899-8930. 95 pages; Sep. 2012 (Year: 2012).

(Continued)

*Primary Examiner* — Don G Zhao
(74) *Attorney, Agent, or Firm* — Snell & Wilmer L.L.P.

(57) ABSTRACT

Systems and methods for assessing cybersecurity risk of a computer network include the use of a risk model application that is configured to determine an initial cyber risk score value based upon an underwriting process. A cyber risk data stream is sent from the client's computer network to the system processor to periodically calculate an updated cyber risk score based upon actual data. The system processor is adapted to use the data stream to generate client information that is accessible by the client via a web-based client portal. In embodiments, the cyber risk data stream can be actively monitored to identify a threat of a cybersecurity breach.

20 Claims, 12 Drawing Sheets

Related U.S. Application Data

(60) Provisional application No. 62/542,655, filed on Aug. 8, 2017.

(56) References Cited

U.S. PATENT DOCUMENTS

| | | | | |
|---|---|---|---|---|
| 9,294,498 | B1* | 3/2016 | Yampolskiy | H04L 63/1425 |
| 9,454,465 | B1* | 9/2016 | Jhoney | G06F 11/3668 |
| 9,648,036 | B2* | 5/2017 | Seiver | H04L 63/1433 |
| 9,654,489 | B2* | 5/2017 | Thomas | H04L 43/10 |
| 9,747,570 | B1* | 8/2017 | Vescio | G06F 21/577 |
| 9,787,709 | B2* | 10/2017 | Doubleday | G06F 8/65 |
| 10,467,559 | B1* | 11/2019 | Svenson | G06Q 20/326 |
| 10,546,135 | B1* | 1/2020 | Kassoumeh | G06Q 10/0635 |
| 10,607,015 | B1* | 3/2020 | Hecht | G06F 9/54 |
| 2006/0085543 | A1* | 4/2006 | Hrastar | H04W 12/122 709/224 |
| 2006/0123133 | A1* | 6/2006 | Hrastar | H04L 63/1491 709/240 |
| 2006/0191012 | A1* | 8/2006 | Banzhof | G06Q 10/06311 726/25 |
| 2006/0195905 | A1* | 8/2006 | Fudge | G06F 11/008 714/E11.02 |
| 2011/0197277 | A1* | 8/2011 | Figlin | H04L 63/1408 709/224 |
| 2012/0316981 | A1* | 12/2012 | Hoover | G06F 16/25 705/26.4 |
| 2013/0138447 | A1* | 5/2013 | Nova | G16H 20/60 705/2 |
| 2013/0339457 | A1* | 12/2013 | Freire | G06Q 10/0635 709/204 |
| 2014/0007206 | A1* | 1/2014 | Carter | H04L 63/1433 726/6 |
| 2014/0075564 | A1* | 3/2014 | Singla | H04L 63/20 726/25 |
| 2015/0067143 | A1* | 3/2015 | Babakhan | H04L 63/1433 709/224 |
| 2015/0088783 | A1* | 3/2015 | Mun | G06Q 40/02 705/36 R |
| 2015/0095719 | A1* | 4/2015 | Namkoong | G06F 11/008 714/47.3 |
| 2015/0163242 | A1* | 6/2015 | Laidlaw | G06F 21/552 726/22 |
| 2015/0324616 | A1* | 11/2015 | Alarabi | G06F 21/88 726/25 |
| 2015/0341795 | A1* | 11/2015 | Tang | H04W 12/12 726/22 |
| 2015/0381649 | A1* | 12/2015 | Schultz | G06Q 10/0635 726/25 |
| 2016/0119373 | A1* | 4/2016 | Fausto | H04L 63/1433 726/25 |
| 2016/0173520 | A1* | 6/2016 | Foster | G06F 21/316 726/25 |
| 2016/0232465 | A1* | 8/2016 | Kurtz | G06Q 10/0635 |
| 2016/0239665 | A1* | 8/2016 | Hamby | G06F 21/577 |
| 2016/0292464 | A1* | 10/2016 | Alarabi | H04L 63/0876 |
| 2016/0321661 | A1* | 11/2016 | Hammond | G06Q 20/20 |
| 2016/0381074 | A1* | 12/2016 | Ahmed Assem | H04W 12/088 726/1 |
| 2017/0039326 | A1* | 2/2017 | Stankiewicz | G06Q 10/063 |
| 2017/0048267 | A1* | 2/2017 | Yampolskiy | H04L 63/08 |
| 2017/0155676 | A1* | 6/2017 | Tamir | G06F 11/2094 |
| 2017/0168921 | A1* | 6/2017 | Jhoney | G06F 11/3692 |
| 2017/0300911 | A1* | 10/2017 | Alnajem | G06Q 20/4014 |
| 2017/0337567 | A1* | 11/2017 | Bracher | G06Q 30/0201 |
| 2018/0082059 | A1* | 3/2018 | Bender | H04L 63/1425 |
| 2018/0124091 | A1* | 5/2018 | Sweeney | H04L 63/1425 |
| 2018/0343507 | A1* | 11/2018 | Petri | H04Q 9/00 |
| 2019/0034845 | A1* | 1/2019 | Mo | G06Q 10/0635 |
| 2019/0188389 | A1* | 6/2019 | Peled | H04L 63/105 |
| 2019/0238584 | A1* | 8/2019 | Somasundaram | H04L 63/1433 |
| 2019/0253269 | A1* | 8/2019 | Keane | H04L 63/0254 |
| 2020/0045064 | A1* | 2/2020 | Bindal | H04L 63/1433 |
| 2021/0105296 | A1* | 4/2021 | Kibler | G06F 11/301 |

OTHER PUBLICATIONS

USPTO; Non-Final Office Action dated Apr. 29, 2020 in U.S. Appl. No. 16/058,726.

USPTO; Notice of Allowance dated Sep. 21, 2020 in U.S. Appl. No. 16/058,726.

U.S. Appl. No. 16/058,726, filed Aug. 8, 2018.

\* cited by examiner

Initial Cyber Risk Assessment Underwriting Process

Periodic Risk Assessment and Risk Score Modeling

Threat Intelligence and Monitoring

FIG. 6
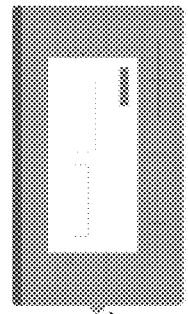
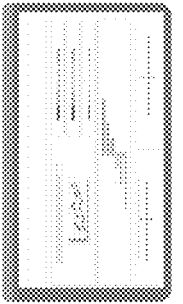
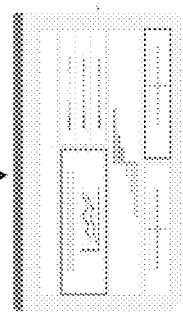
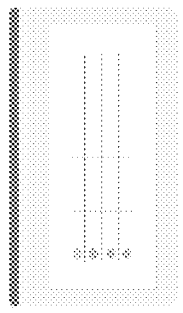
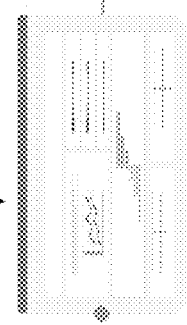
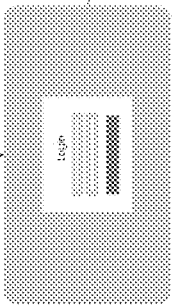

FIG. 7

SYSTEM AND METHOD FOR ASSESSING CYBERSECURITY RISK OF COMPUTER NETWORK

CROSS-REFERENCE TO RELATED APPLICATION

This patent application is a continuation of U.S. patent application Ser. No. 16/058,726, filed Aug. 8, 2018, and entitled, "System and Method for Assessing Cybersecurity Risk of Computer Network," which claims the benefit of priority to U.S. Provisional Patent Application No. 62/542,655, filed Aug. 8, 2017, and entitled, "System and Method for Assessing Cybersecurity Risk of Computer Network," both of which is are incorporated in their entireties herein by this reference.

TECHNICAL FIELD

This patent disclosure relates, generally, to systems and methods for assessing the cybersecurity of a computer network and its susceptibility to attack from external actors and, more particularly, to such systems and methods features and techniques for improving the ability to update the assessment of the cybersecurity risk of a computer network on an ongoing basis.

BACKGROUND

Today insurance carriers underwrite risks of a prospect who is deciding whether to purchase cyber insurance, and, if so, how much to purchase and what coverages to get. Conventionally, this method of underwriting is manual in nature and relies upon the prospective Policyholder providing an accurate picture of their true cyber risk. From this input, the insurance carrier tries to determine effectively the level of risk and associated pricing and coverages that can be offered. Once the insurance carrier underwrites and prices the insured, through the broker, the insured makes a decision and buys the particular coverage and the policy then binds and is in place, typically for twelve months. The insurance carrier has had the risk transferred to its accounts, and over the time period of the policy has no insight into the insured's cybersecurity posture, unless a claim is made. Meanwhile, new cyber exposures are discovered on a daily basis, and thus cyber risk levels are also constantly changing. This leaves the insurance carrier exposed to a potentially higher level of risk than what was determined at the time of underwriting, or even some previously unknown risk, throughout the pendency of the policy period.

There is a continued need in the art to provide additional solutions to help protect a computer network from cyber attacks and to evaluate its susceptibility to such attacks. For example, there is a continued need for techniques for improving the ability to assess the cybersecurity risks associated with a given network on an ongoing basis.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

Aspects of this disclosure are directed to systems, methods, and computer program products for assessing cybersecurity risk of an operating computer network over time. Computer-implemented architecture can include a non-transitory computer-readable medium containing a cybersecurity risk program constructed to periodically determine a value of a cybersecurity risk parameter on a scale where the value is indicative of the cybersecurity risk level of the computer network.

In one aspect, an embodiment of a system for assessing cybersecurity risk of a computer network includes a non-transitory computer-readable medium having a cybersecurity risk program, a cybersecurity processor in operable arrangement with the computer-readable medium, a data storage device in operable arrangement with the cybersecurity processor, and a web-enabled interface communicatively arranged with the cybersecurity processor to exchange information with a client portal. The cybersecurity processor is configured to execute the cybersecurity risk program contained on the computer-readable medium. The data storage device includes a cybersecurity risk parameter with a first value on a scale indicative of a cybersecurity risk level of the computer network at a first time. The web-enabled interface is in communicating relationship with the cybersecurity processor and the data storage device to exchange information with a client portal The cybersecurity risk program includes a cyber risk calculation module and a display module. The cyber risk calculation module is configured to receive input data associated with the computer network at a second time. The second time is different from the first time. The input data corresponds to operational characteristics of the computer network at the second time. The cyber risk calculation module is configured to analyze operational characteristics of the computer network at the second time using a risk model to determine a second value of the cybersecurity risk parameter at the second time. The risk model includes a number of data fields configured to determine a value on the scale indicative of the cybersecurity risk level of the computer network. At least one operational characteristic of the computer network from the input data is used in at least one data field of the risk model. The display module is configured to transmit the second value of the cybersecurity risk parameter at the second time via the web-enabled interface to the client portal for display in a graphical user interface.

In another aspect, an embodiment of a method of assessing cybersecurity risk of a computer network, which has a cybersecurity risk parameter with a first value on a scale indicative of a cybersecurity risk level of the computer network at a first time, includes employing a processor to execute a cybersecurity risk program having computer-executable instructions stored on a non-transitory computer-readable medium. The cybersecurity risk program causes the processor to perform a number of steps.

Input data associated with the computer network is received at a second time. The second time is different from the first time. The input data corresponds to operational characteristics of the computer network at the second time.

The operational characteristics of the computer network are analyzed using a risk model to determine a second value of the cybersecurity risk parameter at the second time. The risk model includes a number of data fields configured to determine a value on the scale indicative of the cybersecurity risk level of the computer network. At least one operational characteristic of the computer network from the input data is used in at least one data field of the risk model.

The second value of the cybersecurity risk parameter at the second time is transmitted to a client portal for display in a graphical user interface.

In another embodiment, a method of monitoring cybersecurity risk of a computer network, which has a cybersecurity risk parameter with a first value on a scale indicative of a cybersecurity risk level of the computer network at a first time, includes actively monitoring the computer network via a cybersecurity system installed within the computer network. The cybersecurity system is configured to generate operational data relating to the computer network at a second time which is different from the first time.

A processor is employed to execute a cybersecurity risk program including computer-executable instructions stored on a non-transitory computer-readable medium causing the processor to perform steps. The operational data of the computer network is analyzed to determine input data corresponding to operational characteristics of the computer network. The input data is transmitted to a risk model configured to determine a second value of the cybersecurity risk parameter at the second time. The risk model includes a number of data fields configured to determine a value on a scale indicative of the cybersecurity risk level of the computer network. At least one operational characteristic of the computer network from the input data is used in at least one data field of the risk model.

As will be appreciated, the systems, methods, and computer program products disclosed herein are capable of being carried out in other and different embodiments and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS AND THE APPENDIX

FIG. 6 is a schematic view of a series of pages of an embodiment of a graphical user interface suitable for use with a client portal constructed according to principles of the present disclosure, illustrating navigation details through the graphical user interface, including login, dynamic dashboard, forecast, notifications, contact cyber risk consultant, and export reports.

Figure 7:
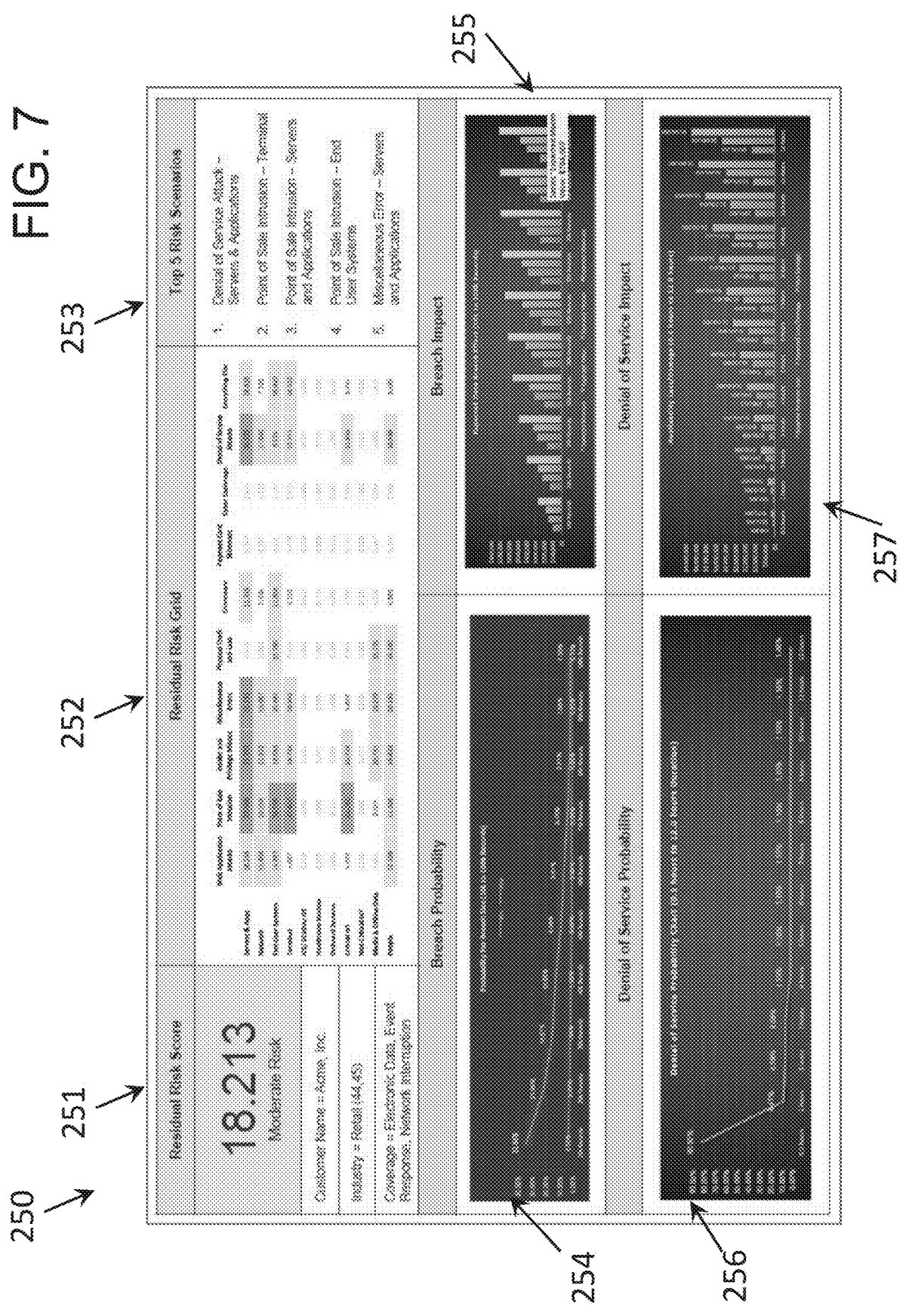

FIG. 7 is a view of an embodiment of a page of a graphical user interface suitable for use with a client portal constructed according to principles of the present disclosure, illustrating dashboard details determined by a cybersecurity risk evaluation application constructed according to principles of the present disclosure including: a cyber risk score computed based upon the cyber risk data stream received from the client computer network, a residual risk grid, a listing of risk scenarios, graphs relating to breach probability, breach impact, denial of service probability, and denial of service impact.

Figure 8:
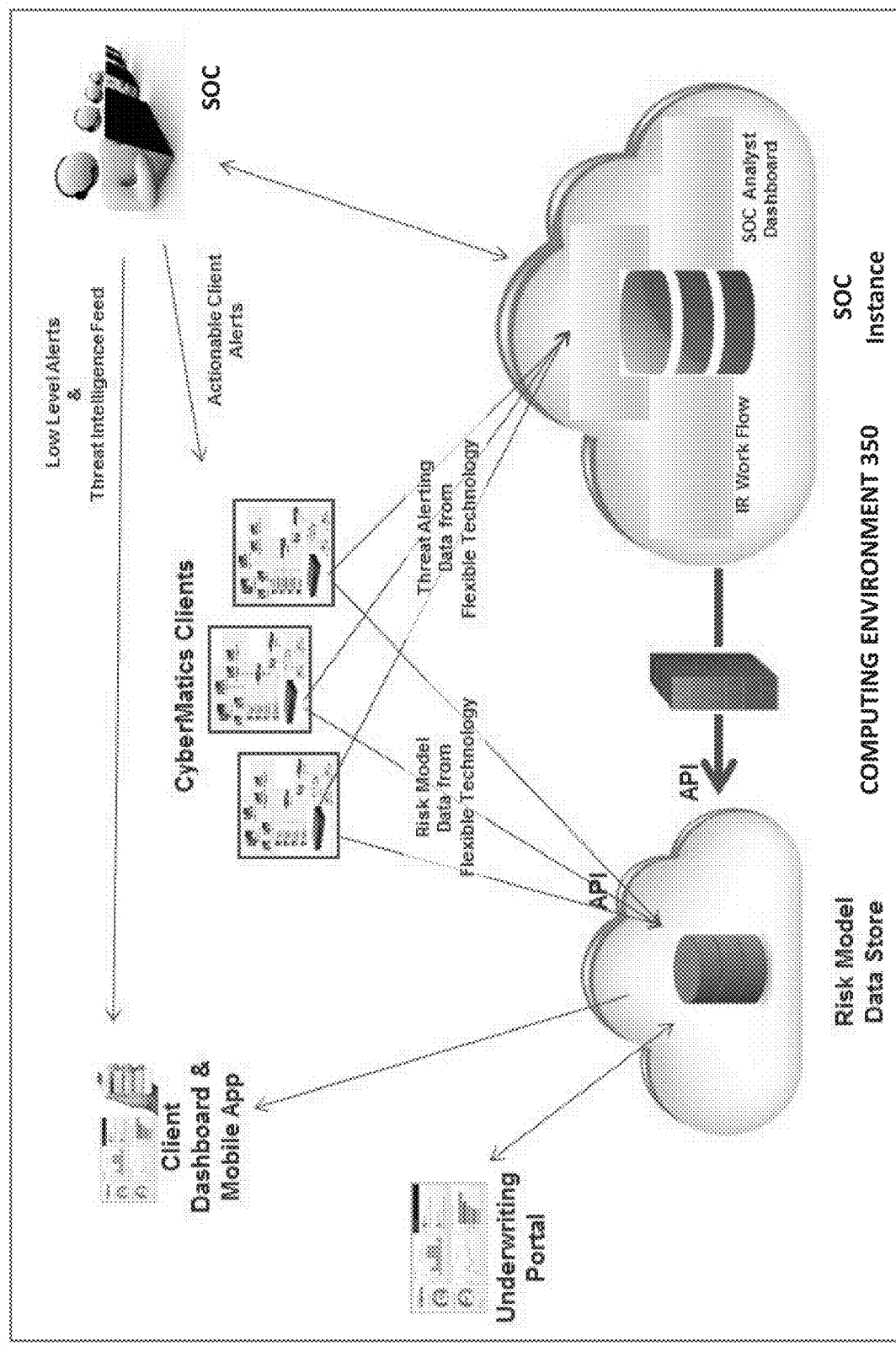

FIG. 8 is another schematic diagram of a part of an embodiment of a system for assessing cybersecurity risk of a computer network which is constructed according to principles of the present disclosure used for monitoring the policy holder's computer network for cybersecurity threats after a cyber insurance policy is issued.

Figure 9:
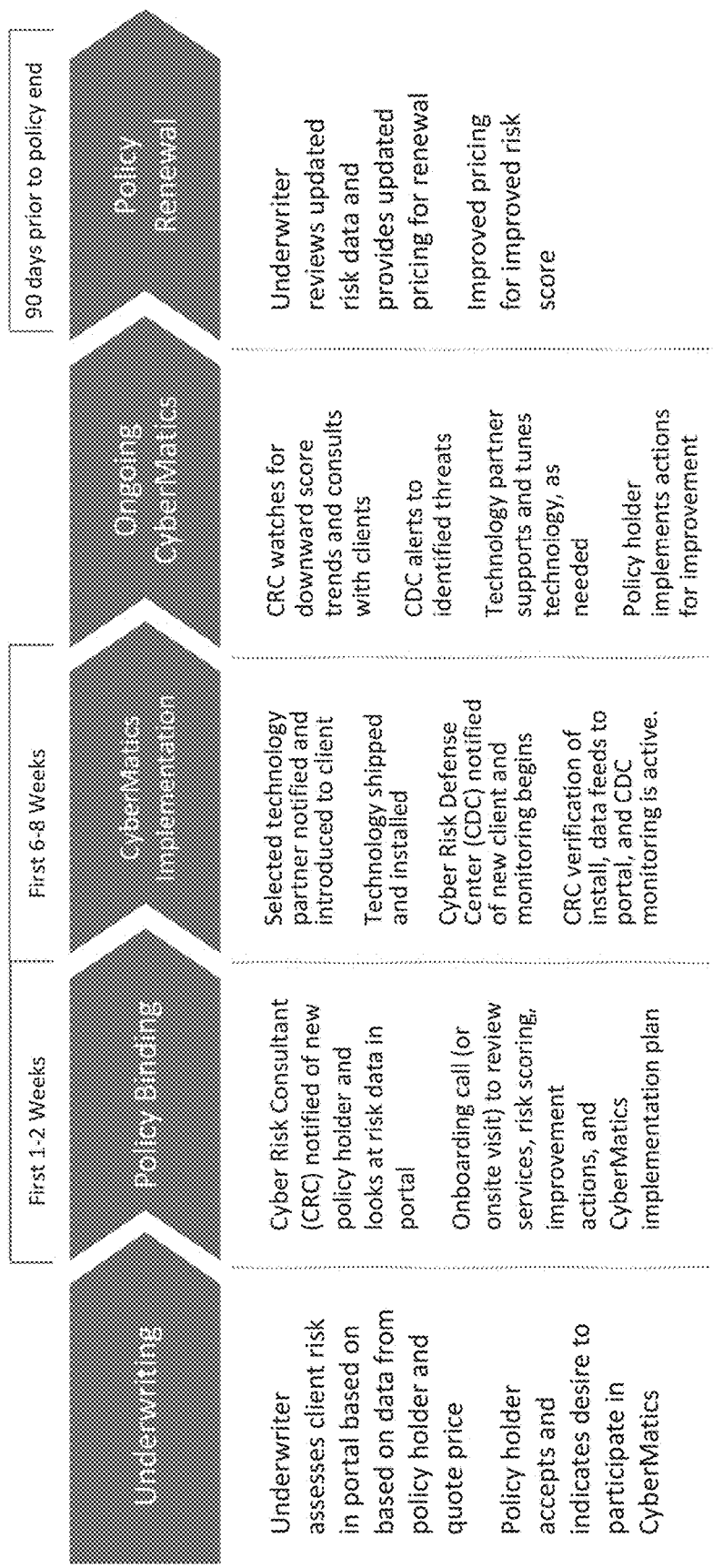

FIG. 9 is a flowchart illustrating steps of an embodiment of a method for assessing cybersecurity risk of a computer network following principles of the present disclosure, the steps occurring before and after a cyber insurance policy is bound.

Figure 10A:
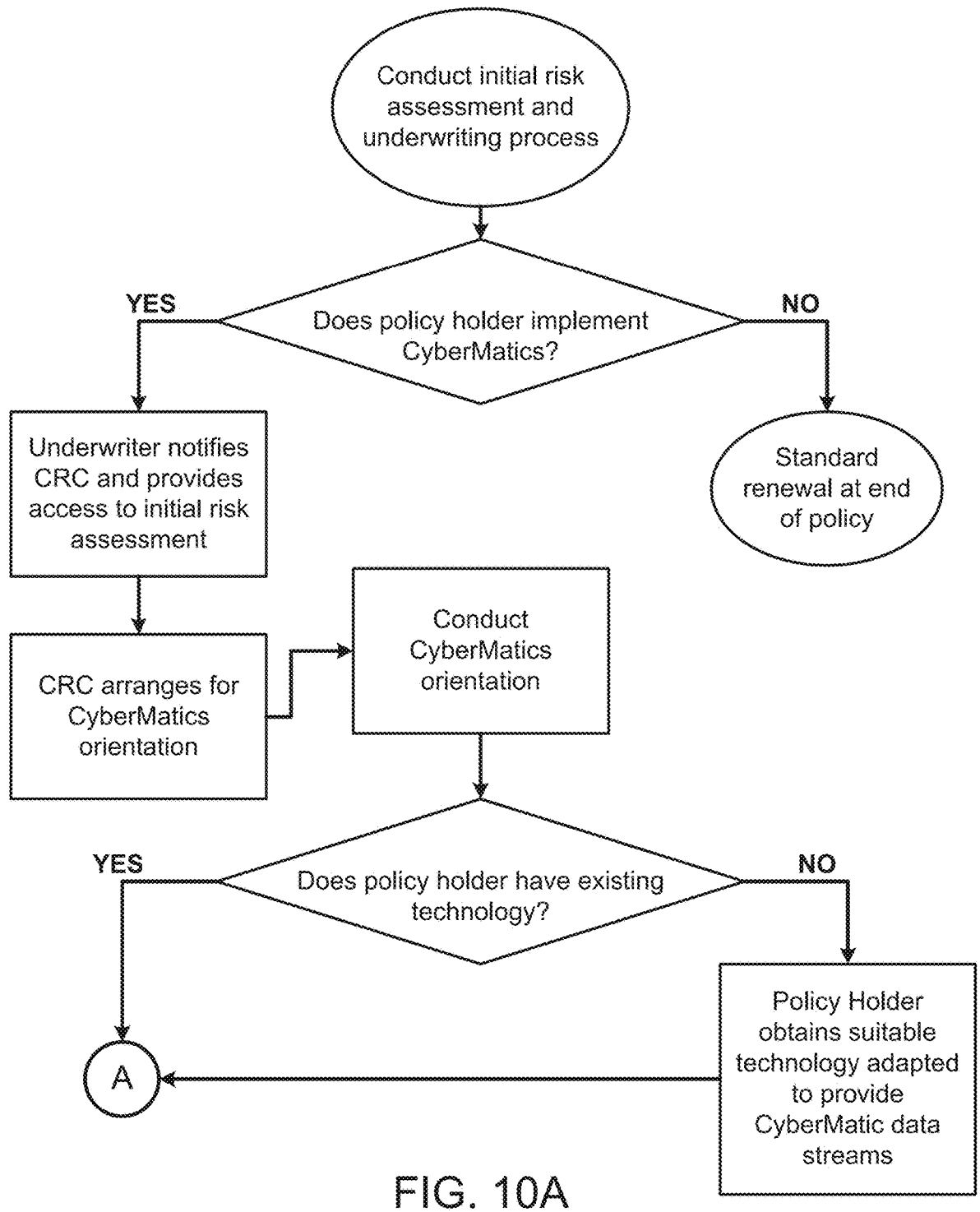
Figure 10B:
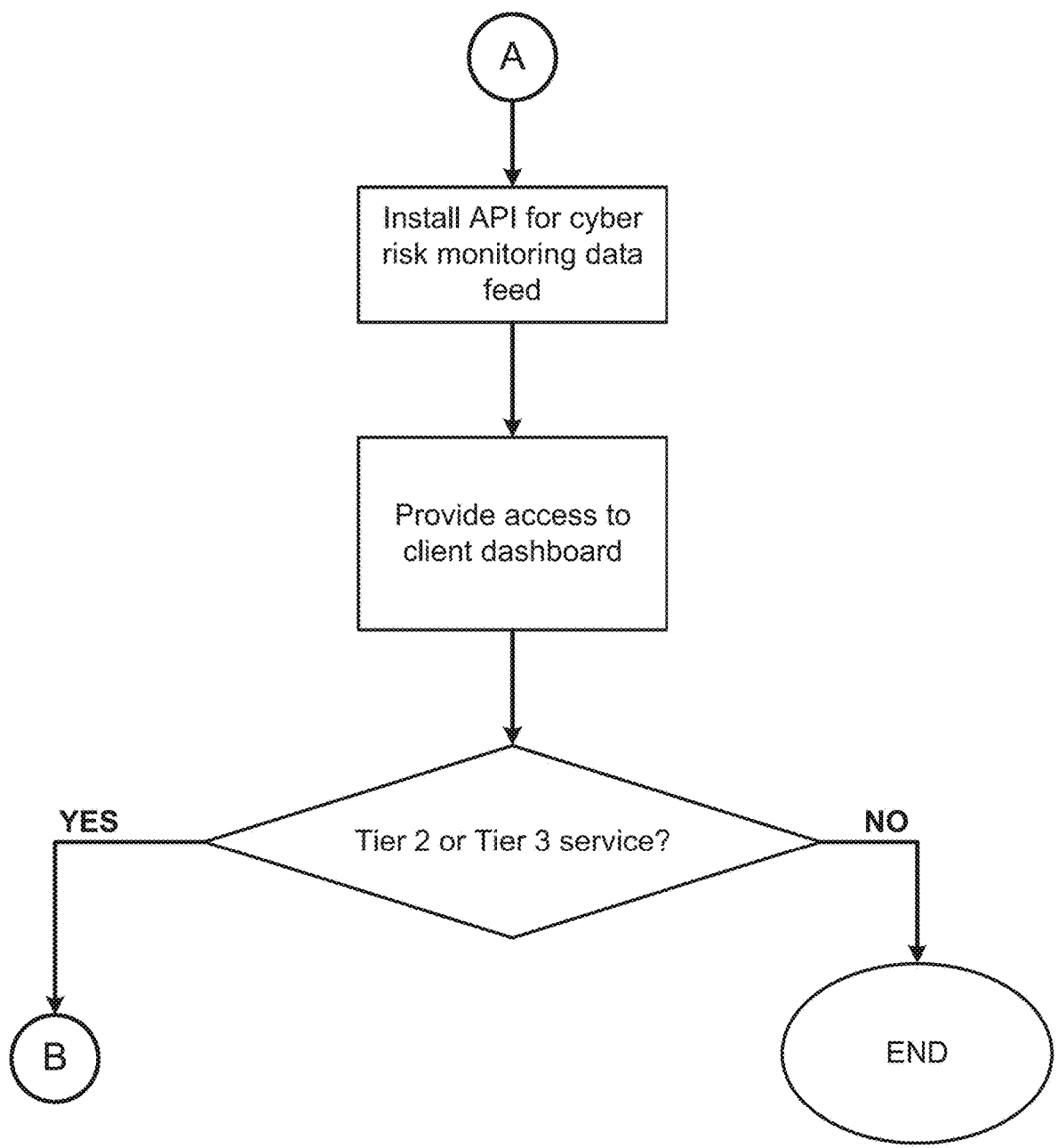
Figure 10C:
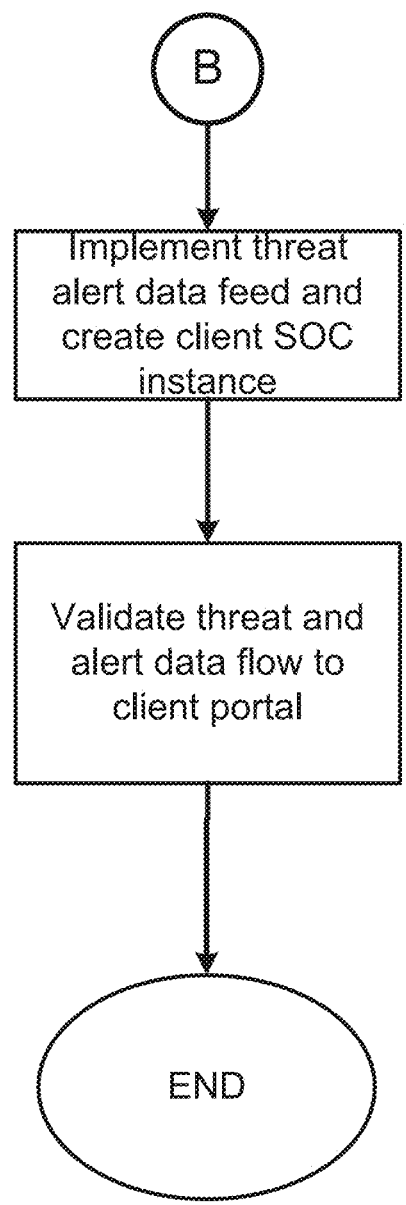

FIGS. 10A-10C is a flowchart illustrating steps of an embodiment of a method for implementing a method of assessing cybersecurity risk of a computer network following principles of the present disclosure.

The APPENDIX is a specimen of an executive summary report that can be generated by an embodiment of . . . suitable for use with the present disclosure.

DETAILED DESCRIPTION

Embodiments of systems and methods for assessing the cybersecurity of a computer network are described herein. Further and alternative aspects and features of the disclosed principles will be appreciated from the following detailed description and the accompanying drawings. As will be appreciated, the principles relating to assessing the cybersecurity of a computer network and updating that assessment on an ongoing basis as disclosed herein are capable of being carried out in other and different embodiments, and capable of being modified in various respects. Accordingly, it is to be understood that the following detailed description is exemplary and explanatory only.

Embodiments of systems and methods for assessing the cybersecurity of a computer network following principles of the present disclosure can be used to effectively assess the cyber risk of a prospective cyber insurance Policyholder. In embodiments, the system can be used to periodically determine and trend a cyber risk score of the Policyholder as determined by a cyber risk modelling computer application, throughout the policy period, via data feeds from a cybersecurity system within the policyholder's computing environment.

Embodiments of a system for assessing cybersecurity risk of a computer network constructed according to principles of the present disclosure provide the ability to automate the risk assessment process, in addition to providing continual, ongoing assessment of an insured's cyber risk posture throughout the policy period, via cybersecurity system-supplied data feeds from the policyholder's computer network to a cybersecurity processor that uses data analytics formulae. With this solution, an insurance carrier can be able to determine how the insured's risk scoring is trending during the policy period, compared to the risk assessment made at initial underwriting. The insurance carrier can then correlate the insured's actual risk posture over the policy period to the insurance premium price and provide updated pricing and incentives at policy renewal.

Embodiments of a system for assessing cybersecurity risk of a computer network constructed according to principles of the present disclosure can also provide insight to the insured on behaviors that are affecting their cyber risk level, both positively and negatively. Based upon information generated by the system, the insured can understand and model changes that can be made which will have the most positive impact upon their cyber risk posture, which could lead to a lower risk score and possible better premium rates.

Embodiments of a system for assessing cybersecurity risk of a computer network constructed according to principles of the present disclosure can provide the ability to monitor and alert the insured of potential threats or actions that may lower their risk based on cyber threat intelligence and insights regarding the insured's computing environment learned from using an embodiment of a method for assessing cybersecurity risk of a computer network following principles of the present disclosure. In this way, cyber security threats and issues can be more quickly identified, isolated, and remediated before they become a significant loss for the insured and the insurance carrier.

The Figures show a number of different embodiments of a system for assessing the cybersecurity of a computer network constructed according to principles of the present disclosure. The Figures also show embodiments of a method for assessing the cybersecurity of a computer network following principles of the present disclosure. As used herein, the term "CyberMatics" refers to a system for assessing the cybersecurity of a computer network constructed according to principles of the present disclosure and/or a method for assessing the cybersecurity of a computer network following principles of the present disclosure method for assessing the cybersecurity of a computer network following principles of the present disclosure.

Figure 1:
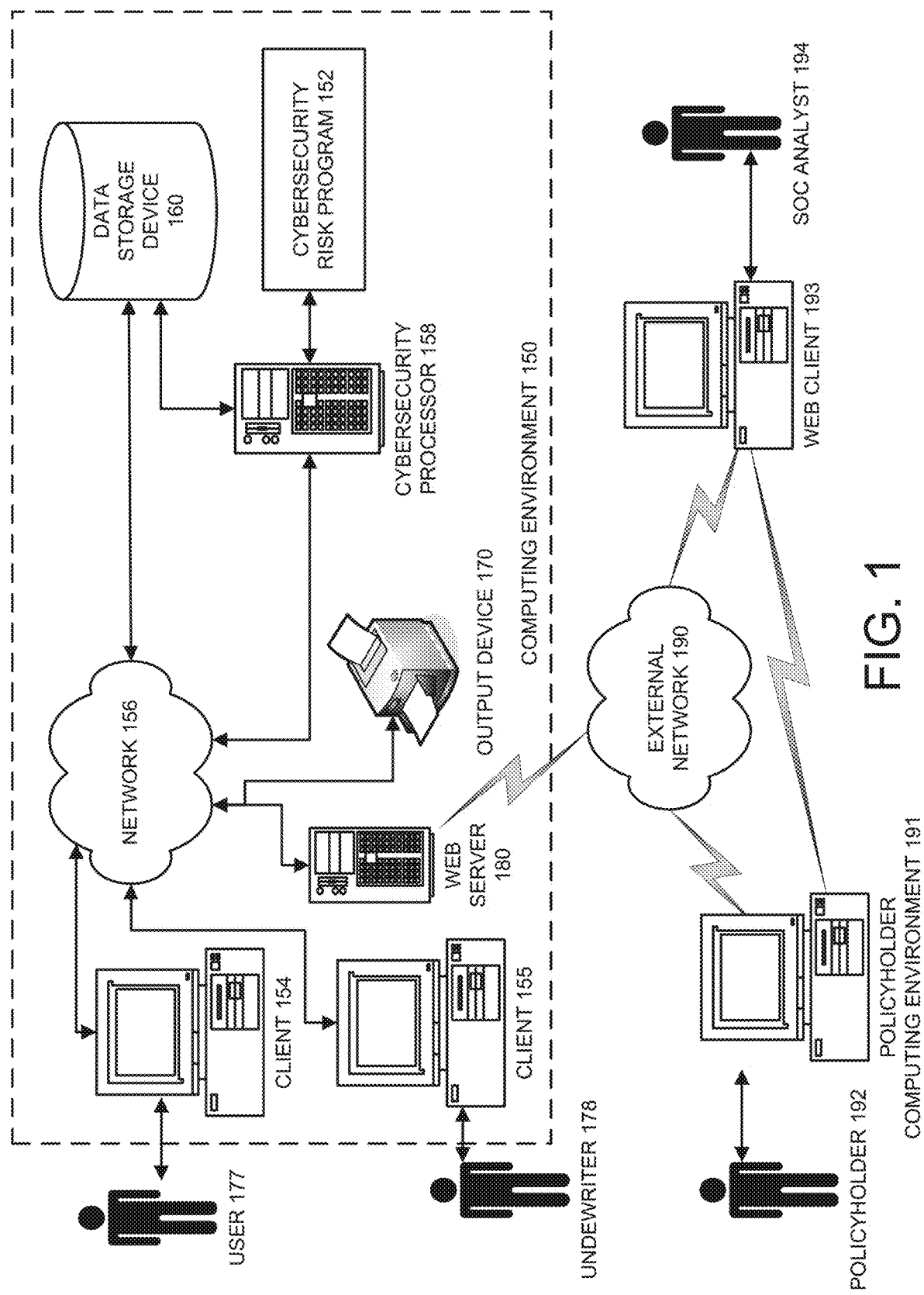
FIG. 1 is a schematic diagram of an embodiment of a computer-implemented system for assessing cybersecurity risk of a computer network constructed according to principles of the present disclosure.

Turning now to the Figures, there is shown in FIG. 1 an embodiment of a computing environment 150 that includes a cybersecurity risk program 152 constructed according to principles of the present disclosure. The cybersecurity risk program 152 is stored on a non-transitory, tangible computer-readable medium. In the illustrated embodiment, a computing environment 191 of a Policyholder 192 and a security operations center (SOC) analyst 194 (either located within the policy holder computing environment 191 or at an offsite location) can be in communication with the computing environment 150 via an external network 190.

The computing environment 150 constitutes a computer-implemented system for assessing cybersecurity risk of a computer network which is constructed according to principles of the present disclosure. In embodiments, the computing environment 150 can receive data from the policyholder computing environment 191 and the web client 193. The computing environment 150 can include a number of computer systems, which generally can include any type of computer system based on: a microprocessor, a mainframe computer, a digital signal processor, a portable computing device, a personal organizer, a device controller, or a computational engine within an appliance. In some embodiments, the computer environment 150 is implemented in one or more electronic devices that are located in one or more locations.

The illustrated computing environment 150 can include clients 154, 155, an internal network 156, at least one cybersecurity processor 158 operating the cybersecurity risk program 152, a data storage device 160, an output device 170, and a web-enabled interface in the form of a web server 180 operatively connected to the external network 190. The clients 154, 155, the cybersecurity processor 158, the data storage device 160, the output device 170, and the web server 180 are operatively connected together via the internal network 156. The cybersecurity processor 158 is in operable arrangement with the computer-readable medium containing the cybersecurity program 152. The data storage device 160 is in operable arrangement with the cybersecurity processor 158.

The cybersecurity processor 158 is configured to execute the cybersecurity risk program 152 contained on the computer-readable medium. The web-enabled interface 180 is communicatively arranged with the cybersecurity processor 158 and the data storage device 160 to exchange information with a client portal 191. The cybersecurity processor 158 can be specially programmed with the cybersecurity risk program 152 to monitor and log the cybersecurity risk conditions occurring within the policyholder computing environment 191, to determine a security risk score based upon the data sent from the policyholder computing environment 191 to the computing environment 150 via the external network 190, and to provide monitoring services, as selected, using a threat alert data stream from the web client 193.

At least one web client 191, 193 can use the computing environment 150 to interface with the computing environment 150 via the web server 180. For example, the Policyholder 192 can use the web client 191 to receive information from, and to transmit information to, the computing environment 150 about the cybersecurity of its computing environment using a client portal generated by the cybersecurity risk program 152. In embodiments, a plurality of policyholders can use other web client(s) to communicate with the cybersecurity risk program 152 over the external network 190. In other embodiments, a different communication channel can be established between the policyholder computing environment 191, the SOC web client 193, etc. and the cybersecurity risk program 152 to transmit data feeds to the cybersecurity risk program 152.

The client 154 can be used to communicate with an authorized user 177, for example, to enter cybersecurity parameter conditional requirements and criteria into the data storage device 160, to communicate with the web clients 191, 193, and/or to execute the cybersecurity risk program 152. The client 154 can comprise at least one input device. The client 154 can generally include any node on a network including computational capability and including a mechanism for communicating across the network 156.

In one embodiment, the client 154 hosts an application front end of the cybersecurity risk program 152. The application front end can generally include any component of the cybersecurity risk program 152 that can receive input from the user 177 or the client 154, communicate the input to the cybersecurity risk program 152, receive output from the cybersecurity risk program 152, and present the output to the user 177 and/or the client 154. In one embodiment, the application front end can be a stand-alone system.

In the illustrated embodiment, the client 155 hosts an application front end of the cybersecurity risk program 152 in the form of a graphical user interface comprising the Underwriting Portal. The Underwriting Portal is adapted to facilitate the entry of data into the data storage device 160 used in the underwriting process for the cyber insurance policy issued to the Policyholder 192 as described above. The Underwriting Portal is also configured to facilitate the renewal process. In embodiments, the Underwriting Portal facilitates the risk assessment process and centralizes all the policyholder risk data the Underwriter 178 uses to make cyber policy pricing decisions. In embodiments, the data storage device 160 includes a cybersecurity risk parameter with a first value on a scale indicative of a cybersecurity risk level of the computer network at an initial time. The initial time can correspond to the beginning (or near the beginning of a policy period.

In the illustrated embodiment, the web client 191 hosts an application front end of the cybersecurity risk program 152 in the form of a graphical user interface comprising the Client Portal. The Client Portal is adapted to show the risk score data of the Policyholder 192, and with analytics provides risk improvement modeling capability. In embodiments, the Client Portal is adapted to feed threat intelligence to Policyholders 192 that participate in the CyberMatics program.

The network 156 can generally include any type of wired or wireless communication channel capable of coupling together computing nodes. Examples of a suitable network 156 include, but are not limited to, a local area network, a wide area network, or a combination of networks.

The cybersecurity processor 158 is in operable arrangement with the non-transitory, computer readable medium upon which the cybersecurity risk program 152 is stored so as to be able to operate the program 152. The cybersecurity processor 158 is configured to execute the cybersecurity risk program 152 contained on the computer-readable medium. The cybersecurity processor 158 can generally include any computational node including a mechanism for servicing requests from a client for computational resources, data storage resources, or a combination of computational and data storage resources. Furthermore, the cybersecurity processor 158 can generally include any system that can host the cybersecurity risk program 152. The cybersecurity processor 158 can generally include any component of an application that can receive input from the web client(s) 191 via the web server 180 and from the client 154 through the network 156, process the input, and present the output to the cybersecurity risk program 152, the client 154, the web server 180, and/or the data storage device 160. The cybersecurity processor 158 can generally include any component of an application that can process data, interact with the data storage device 160, and execute logic for the cybersecurity risk program 152.

The cybersecurity risk program 152 comprises a computer program product residing on a non-transitory, tangible computer readable medium having a plurality of instructions stored thereon which, when executed by the cybersecurity processor 158, cause the processor 158 to perform steps associated with an embodiment of a method for assessing cybersecurity risk of a computer network following principles of the present disclosure. The cybersecurity risk program 152 can be any suitable computer-implemented application for processing information exchanged with the clients 154, 155 and/or the web clients 191, 193 via a web platform such as those known to one of ordinary skill in the art. The cybersecurity risk program 152 can contain computer executable instructions adapted to exchange information in the form of data with the data storage device 160. The cybersecurity risk program 152 can include a graphical user interface which can facilitate the input of underwriting information into the cybersecurity risk program 152 and the display of underwriting information generated by the cybersecurity risk program via an Underwriting Portal and another graphical user interface which can facilitate the input of policyholder information into the cybersecurity risk program 152 and the display of cybersecurity risk information concerning the policyholder computing environment 191 generated by the cybersecurity risk program 152 via a Client Portal.

In embodiments, the cybersecurity risk program 152 includes a cyber risk score module, a SOC module, a forecast module, a cybersecurity risk reduction module, and a display module. The cyber risk score module includes a computer executable code segment configured to use the data received from the policyholder computing environment 191 to determine a cyber risk score pertaining to the policyholder computing environment 191 using information from the Underwriting Portal through the client 155 and/or data received from the policyholder computing environment 191 on a continual basis over the policy period. In embodiments, the cyber risk calculation module is configured to receive input data associated with the computer network at periodic time intervals. The input data corresponds to operational characteristics of the computer network at the second time. The cyber risk calculation module is configured to analyze operational characteristics of the computer network at each time using a risk model to determine an updated value of the cybersecurity risk parameter at the given time. The risk model includes a number of data fields configured to determine a value on the scale indicative of the cybersecurity risk level of the computer network. At least one operational characteristic of the computer network from the input data is used in at least one data field of the risk model.

In embodiments, the risk model includes a threat likelihood module, a business impact module, and a control effectiveness module. The cyber risk calculation module can be configured to analyze the operational characteristics of the computer network using the risk model to determine a residual risk score. In embodiments, the residual risk score can be based upon a control effectiveness value from the control effectiveness module being deducted from a product of a threat likelihood value from the threat likelihood module and a business impact value from the business impact module ((threat likelihood×business impact)—control effectiveness).

In embodiments, the business impact module is configured to calculate the business impact value based upon asset data from the data storage device 160. The asset data can be associated with an operational configuration of the client computer network 191.

The SOC module includes a computer executable code segment that can be configured to provide cybersecurity alerting functions and to take remedial measures within the policyholder computing environment 191 in response to cybersecurity threat data received from the web client 193 pertaining to the policyholder computing environment 191. In embodiments, the SOC module, or monitoring module, is configured to monitor a data feed, such as one from the web client 193, received from a cybersecurity system installed within the computer network 191 for a valid threat alert. In embodiments, the monitoring module is configured to monitor a data feed, such as one from the web client 193, received from a cybersecurity system installed within the computer network for a valid threat alert, and, in response to receiving the valid threat alert, to actively modify the computer network by implementing a protective measure configured to reduce the threat.

The forecast module of the cybersecurity risk program 152 can be configured to calculate a cyber risk score for the client's computer network 191 based upon the data in the data storage device 160 for a given time, but modified to include one or more selected security controls that are determined not to be present in the computer network 191. In embodiments, the forecast module of the cybersecurity risk program 152 can be configured, in response to receiving a forecast request from the client portal 191 via the web-enabled interface 180 for at least one of a set of cybersecurity controls not present within the client computing environment 191, to analyze the operational characteristics of the computer network 191 modified by assuming the selected one(s) of the set of cybersecurity controls not present within the computer network 191 is/are implemented in the computer network 191 using the risk model to determine a forecasted value of the cybersecurity risk parameter.

The cybersecurity risk reduction module of the cybersecurity risk program can be configured to select a cybersecurity control that is determined to not be present within the client's computer network 191 to recommend for inclusion in the computer network based upon its calculated effectiveness either being above a predetermined threshold or within a predetermined range of most effective choices. In embodiments, the cybersecurity risk reduction module of the cybersecurity risk program can be configured to select a cybersecurity control from a set of cybersecurity controls not present within the computer network 191. The cybersecurity risk reduction module can be configured to determine the selected cybersecurity control by calculating a relative effectiveness value for each of the set of cybersecurity controls and identifying the highest relative effectiveness value.

The display module is configured to display information in, and receive information from, the graphical user interface of the cybersecurity risk program 152. The display module is configured to transmit the updated value of the cybersecurity risk parameter at a periodic time interval via the web-enabled interface 180 to the client portal 191 for display in the graphical user interface. The display module can be configured to transmit the forecasted value of the cybersecurity risk parameter via the web-enabled interface 180 to the client portal 191 for display in the graphical user interface. The display module can be configured to transmit the residual risk score via the web-enabled interface 180 to the client portal 191 for display in the graphical user interface. The display module can be configured, in response to the monitoring module receiving the valid threat alert, to transmit an alert message via the web-enabled interface 180 to the client portal 191 for display in the graphical user interface. The display module is configured to transmit data concerning the selected cybersecurity control via the web-enabled interface 180 to the client portal 191 for display in the graphical user interface. In embodiments, the display module can be configured to display in the Client Portal at the policyholder computing environment 191 one or more of the frames of the graphical user interface that correspond to the Executive Summary Report found in the Appendix (or a portion thereof).

In embodiments, the display module can be configured to generate a graphical user interface that includes the display areas for the following items generated by the cybersecurity risk program 152. Each item can include a numerical score determined by the cybersecurity risk program 152 and housed in the data storage device 160 for the client itself and for peers of the client to provide peer benchmarking abilities:

CYBER RISK MATURITY—An entity's preparedness against cyber threats and its ability to protect its information assets contained within a given computer network.

THREAT LIKELIHOOD—The likelihood of a malicious or unintended action that may expose one or more weaknesses within the computer network.

BUSINESS IMPACT—The degree of confidentiality, integrity, and availability impact associated with applicable assets within an organization.

IMPLICIT RISK—The inherent risk associated with the computer network. The combination of threat and impact risk associated with an organization, not including benefits of cybersecurity controls.

CONTROL EFFECTIVENESS—The synergistic risk reducing benefit provided by the implemented controls within the computer network. The score can indicate how much each control reduces risk, depending on how well the controls are implemented.

RESIDUAL RISK—The remainder of risk associated with the computer network (Implicit Risk minus Control Effectiveness). The score reflects the remaining combination of threat and impact risk associated with an organization, including benefits of cybersecurity controls.

PROBABILITY AND IMPACT—The score reflects data breach and interruption probability and impact.

RISK INDEX PER THREAT CATEGORY—Compares the calculated risk index with an expected value for each risk category, helping diagnose areas of vulnerability.

PRIORITIZED CONTROL RECOMMENDATIONS—A listing of controls that would most help the risk posture of the computer network and the relative effectiveness of each.

TOP RISK SCENARIOS—The potential cyber threat scenarios most likely to impact the computer network, and the exposure the client has for each type of attack. The top risk scenarios presented provide a priority list of the most likely threat impact scenarios a client should be concerned about.

DATA BREACH AND INTERRUPTION (Denial-of-Service, DoS)—The monetary effect of data breaches and lost business due to service interruption within the computer network.

The architecture solution of the cybersecurity risk program 152 is flexible and scalable to include additional information for different Policyholders 192 and to include additional cybersecurity information for the various policyholder computing environments 191 connected to the computing environment 150. In embodiments, the cybersecurity risk program 152 includes other modules and computer-executable instructions adapted to carry out other steps and features of a method of assessing cybersecurity risk of a computer network following principles of the present disclosure. Any suitable computer-readable storage medium can be utilized for the cybersecurity risk program 152, including, for example, hard drives, floppy disks, CD-ROM drives, tape drives, zip drives, flash drives, optical storage devices, magnetic storage devices, and the like.

The data storage device 160 is in operable arrangement with the cybersecurity processor 158. The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory. In embodiments, the data storage device 160 is operably arranged with the cybersecurity processor 158 and is adapted to store cybersecurity data for each computing environment 191 for which the system 150 is being used.

In embodiments, the data storage device 160 includes a data store, architecture, and structure that are adapted to supports the Underwriting Portal and the Client Portal. The data store can be configured to store client risk profile and trending data, and can be adapted to feed the Underwriting Portal and the Client Portal selected data pertaining to a given Policyholder 192 and the peer universe of the Policyholder 192. In embodiments, the data store allows for data analytics processes of the cybersecurity risk program 152 to run against the policyholder data in the data store to assist with client risk reduction consulting efforts.

In embodiments, the data storage device 160 can store a data warehouse that comprises a collection of databases (e.g., Access, SQL). For example, the data storage device 160 can contain a permission database which stores user credentials and permissions specific to active users 177, Underwriters 178, Policyholders 192, SOC analysts 194, and others that interact with the computing environment 150.

The output device 170 can comprise a printer, a display monitor, and a connection to another device, for example. The output device 170 can be used to generate reports for sending to the Underwriter 178 and/or the Policyholder 192 which contributed to the information generated by the cybersecurity risk program 152. The output device 170 can be used to communicate to the user 177 information generated by the cybersecurity risk program 152.

A report engine can be provided to generate displays of information stored in the data storage device 160 concerning the cybersecurity conditions tracked by the system 150, which can be viewed using the output device 170, for example. In one embodiment, the report engine further provides pre-configured and/or ad hoc reports relating to the cybersecurity conditions of each computing environment 191 tracked by the system 150. An exemplary report that can be produced using data generated using CyberMatics is found in the Appendix. In embodiments, the report can be a subset of the Executive Summary Report found in the Appendix.

The web server 180 can provide a suitable web site or other Internet-based graphical user interface (e.g., the Client Portal) which is accessible by the Policyholder 192, providing cybersecurity condition information data feeds, for example. The web server 180 can serve as a web-enabled interface adapted to exchange information with multiple facilities including to receive cybersecurity data from each computing environment via a suitable application program interface (API), for example. In other embodiments, other sites can be connected to the web-enabled interface 180.

In embodiments, API connectors for each technology that is vetted and for participation in the CyberMatics process can be made available for use with the computing environment 150. The API connectors are adapted to translate the data produced by the technology found in the policyholder computing environment 191 to the risk model of the cybersecurity risk program 152 via the data store 160. In embodiments, an API can be provided for incident client data, for those participating in the monitoring levels of service, to be generalized and fed to the data store 160, which in turn will update specific elements of their risk profile.

In embodiments, at least one of the web server 180 and the external network 190 is equipped with an application program interface (API) interconnected between the cybersecurity processor 158 and a cybersecurity system installed within the computer network 191. The API is configured to direct the input data associated with the computer network 191 from the computer network 191 to the cybersecurity processor 158. In embodiments, the API is configured to transmit input data to the cybersecurity processor in a form that does not contain data produced within the computer network.

The web server 180 can provide access to an internet-based web platform that includes the cybersecurity risk program 152. In some embodiments, the web server 180 can be adapted to host a web site, to execute enterprise applications, to deliver web pages and other content upon request to web clients, and to receive content from web clients. The web client(s) 191, 193 can be connected to the web server 180 through the network connection 190 (e.g., Internet, Intranet, LAN, WAN and the like). The web server 180 can use an authentication server in order to validate and assign proper permissions to authorized users of the system. A permission database can store web user credentials and permissions specific to each user, investor, agent, broker, market information source, etc. The web server 180 can be outfitted with a firewall such that requests originating from outside the computing environment 150 pass through the firewall before being received and processed at the web server 180.

In addition to the components discussed above, the computing environment 150 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

In yet other embodiments, the computing environment can include an electronic common repository for electronic documents relating to cybersecurity information. The electronic common repository can be used by users 177, Underwriters 178, Policyholders 192, and SOC analysts 194, and others according to a set of authorized permissions to the respective party to upload/download electronic documents generated at different times of the process.

In other embodiments, systems and methods of assessing cybersecurity risk of a computer network according to principles of the present disclosure, can be implemented on various types of computer architectures, such as for example on a single general purpose computer or workstation, on a networked system, in a client-server configuration, or in an application service provider configuration. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other tangible computer-readable media for use by a computer program.

The computer components, software modules, functions, data stores and data structures described herein may be connected directly or indirectly to each other in order to allow the flow of data needed for their operations. It is also noted that a module or processor can include but is not limited to a unit of code that performs a software operation, and can be implemented, for example, as a subroutine unit of code, a software function unit of code, an object (as in an object-oriented paradigm) or an applet and can be implemented in a computer script language or another type of computer code. The software components and/or functionality (e.g., the allocation functionality associated with the payment election) can be located on a single computer or distributed across multiple computers depending upon the particular circumstances surrounding its use (e.g., located on client and/or server computers).

In various embodiments, methods of assessing cybersecurity risk of a computer network in accordance with principles of the present disclosure operate as software programming operating on a computer processor. Dedicated hardware implementations, including, but not limited to, application-specific integrated circuits, programmable logic arrays and other hardware devices, can likewise be constructed to implement the methods described herein. Furthermore, alternative software implementations, including, but not limited to, distributed processing or component/object distributed processing, parallel processing, or virtual machine processing, can also be constructed to implement the methods described herein.

In various embodiments, a cybersecurity risk program in accordance with principles of the present disclosure can take the form of a computer program product on a non-transitory, tangible computer-readable storage medium having computer-readable program code means embodied in the storage medium. Software implementations of the techniques for assessing cybersecurity risk of a computer network as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a non-transitory, tangible storage medium includes a distribution medium and art-recognized equivalents and successor media, in which the software implementations herein are stored.

Additionally, embodiments of a cybersecurity risk program 152 stored upon a non-transitory, computer-readable medium following principles of the present disclosure contain a plurality of instructions which, when executed by the cybersecurity processor 158, cause the processor 158 to perform steps associated with assessing cybersecurity risk of a computer network following principles of the present disclosure. In embodiments, the cybersecurity risk program 152 stored upon a non-transitory, computer-readable medium can be configured to carry out any embodiment of a method of assessing cybersecurity risk of a computer network following principles of the present disclosure. In embodiment, the cybersecurity processor 158 is adapted to execute the programming stored upon the non-transitory computer readable medium to perform various methods, processes, and modes of operations in a manner following principles of the present disclosure.

In embodiments of a method of assessing cybersecurity risk of a computer network following principles of the present disclosure, the CyberMatics system 150 can be used to monitor the cybersecurity conditions of a policyholder's computing environment 191. In embodiments, a method of assessing cybersecurity risk of a computer network 191 following principles of the present disclosure includes employing a processor 158 to execute computer executable instructions stored on a tangible computer-readable medium 152 to perform a step of periodically determining a cyber risk score based upon a data stream sent from the policyholder computing environment 191.

Figure 2:
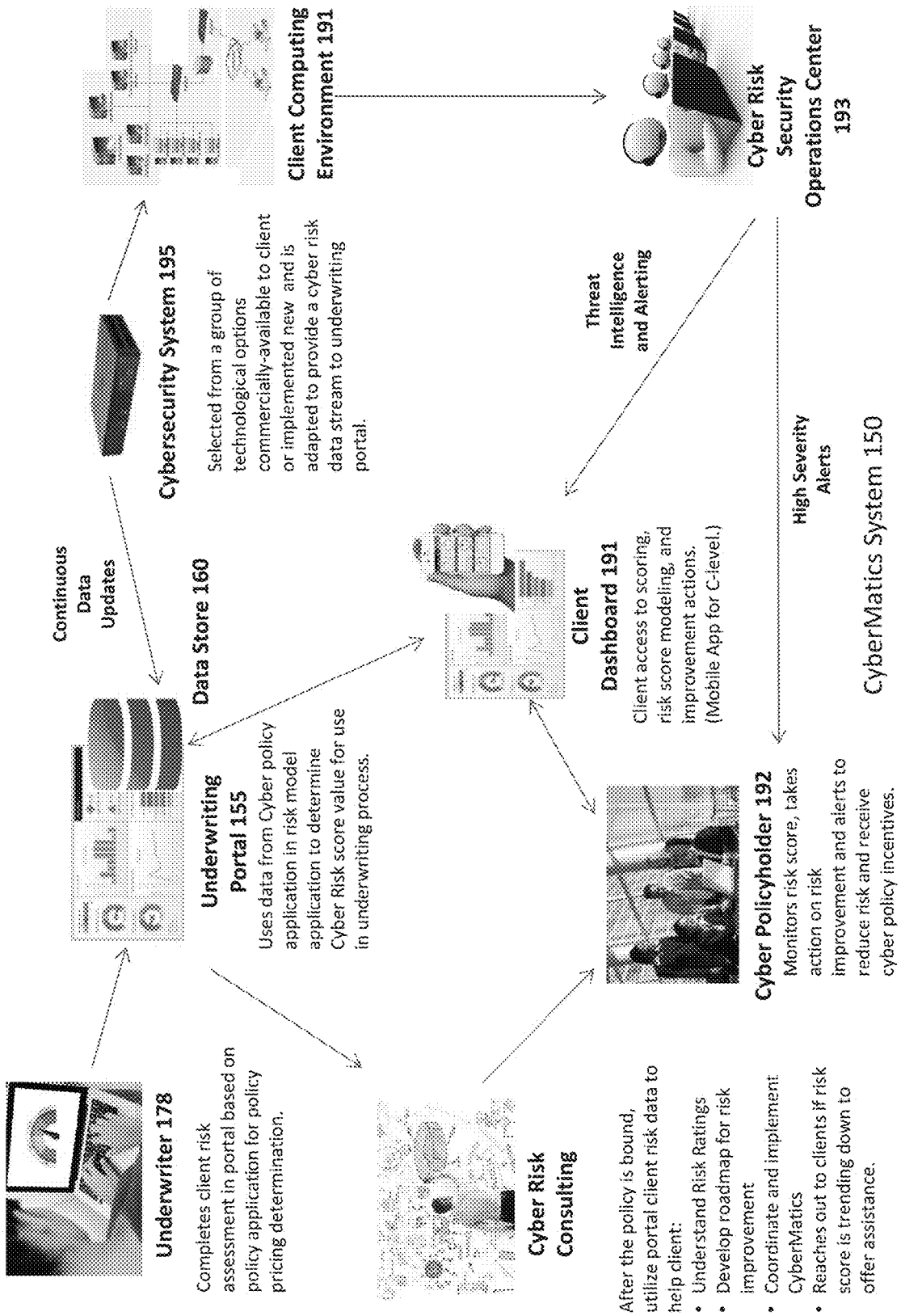
FIG. 2 is a schematic diagram of a method of using an embodiment of a system for assessing cybersecurity risk of a computer network which is constructed according to principles of the present disclosure.

Referring to FIG. 2, a schematic diagram is shown of an embodiment of a system for assessing cybersecurity risk of a computer network which is constructed according to principles of the present disclosure. A risk model can be provided within the cybersecurity risk program 152 that accepts various data inputs and produces the resulting risk score that can act as the basis for underwriting decisions that determine premium pricing and risk coverages and provides the ability to articulate more clearly to the insured the pricing aspects of the risk transfer and coverage provided.

In embodiments, the risk scoring model incorporates a number of data points that help determine the level of cyber risk that exists within an insured's computing environment 191. Exemplary data points include the types of software within the environment and current patching levels. Combined with weighting assigned to different points and associated analytics, the risk model can be configured to produce a resulting risk score. In embodiments, the risk scoring application is adapted to combine the elements of threat, impact, and controls, to determine a numerical cyber risk score. In embodiments, the cyber risk application is adapted to account for existing cyber threats to a Policyholder based on industry, size, and other factors, and is maintained and updated based on regular security intelligence. The cyber risk application determines the impact those threats may have to the Policyholder's business and then accounts for existing controls the Policyholder has in place that reduce the associated impact levels. The model and resulting risk score are generated by input to a number of data fields that feed the required data to the risk program. In embodiments, the risk scoring program can be based upon or comprise a commercially-available cyber risk scoring application, such as one commercially available from Secure Systems Innovation Corporation (SSIC) of Arlington, Va., for example.

The system of FIG. 2 can include a web-based portal architecture that facilitates the inputs to the data points, summary data storage, and resulting output of the risk model for the Underwriter 178 to view and use via an Underwriting Portal 155, as well as providing summary risk reports to the insured via the client portal 191. In embodiments, Application Program Interfaces (APIs) for various security technologies can be provided to establish connectivity between the portal architecture with a cybersecurity system 195 installed within the insured's computing environment 191. The APIs facilitate the continuous updating of data points within the risk model during the policy period.

The Underwriter 178 completes the initial risk assessment in the Underwriting Portal 155 based on client input for policy pricing determination. The Underwriting Portal 155 uses data from the application process to develop a risk score using the risk model at underwriting. In embodiments, the risk model can be used to score and quantify client cyber risk: current threat intelligence and effectiveness of an organization's cybersecurity controls based on the data from the application responses and the potential impact of a cyber breach on the organization. The model can be based upon empirical data of patterns of how companies experience cyber breaches: points of entry and types of attacks and vulnerabilities seen in cyber breach scenarios.

The cybersecurity system 195 installed within the client computing environment 191 provides periodic updates regarding operational characteristics of the client computing environment that are configured to allow the cyber risk score to be re-calculated. The data store 160 can be used as a central repository for risk analysis data.

In embodiments, an API connects to the cybersecurity technology 195 in the client's computing environment 191 once per week (or another suitable period of time). The connection is not persistent and only connects when it is time to pull the most recent risk model data. In embodiments, a "Data Last Updated" field in the graphical user interface of the dynamic dashboard 191 reflects the last successful connection to the cybersecurity system 195 installed within the client's computer network 191. In embodiments, the CyberMatics system 150 does not collect any client systems data, system logs, IP addresses, or any other client-specific data as part of the CyberMatics connection. In embodiments, the CyberMatics system 150 periodically queries the cybersecurity system 195 installed within the client's computer network 191 via the API to determine what the current answers are to the questions in the cyber application that the cybersecurity system 195 installed within the client's computer network 191 is able to answer. For example, if the technology 195 detects that anti-virus is installed on all endpoints, it can return a "yes" value to that control question in the application via the API. In response, the CyberMatics system 150 changes only that answer from "no" to "yes" based on the periodic connection update to the client's computing environment 191.

The risk score information generated by the cyber risk processor 158 of the CyberMatics system 150 can be viewed by the client 192 via the web-based client dashboard 191. The client dashboard gives the Policyholder 192 the ability to see updated risk score data and trends over the life of the policy, through technology driven data feeds and analytics; allows for added insight into the insured environment, for both the carrier and the insured; and identifies behaviors that are affecting the level of cyber risk.

Figure 3:
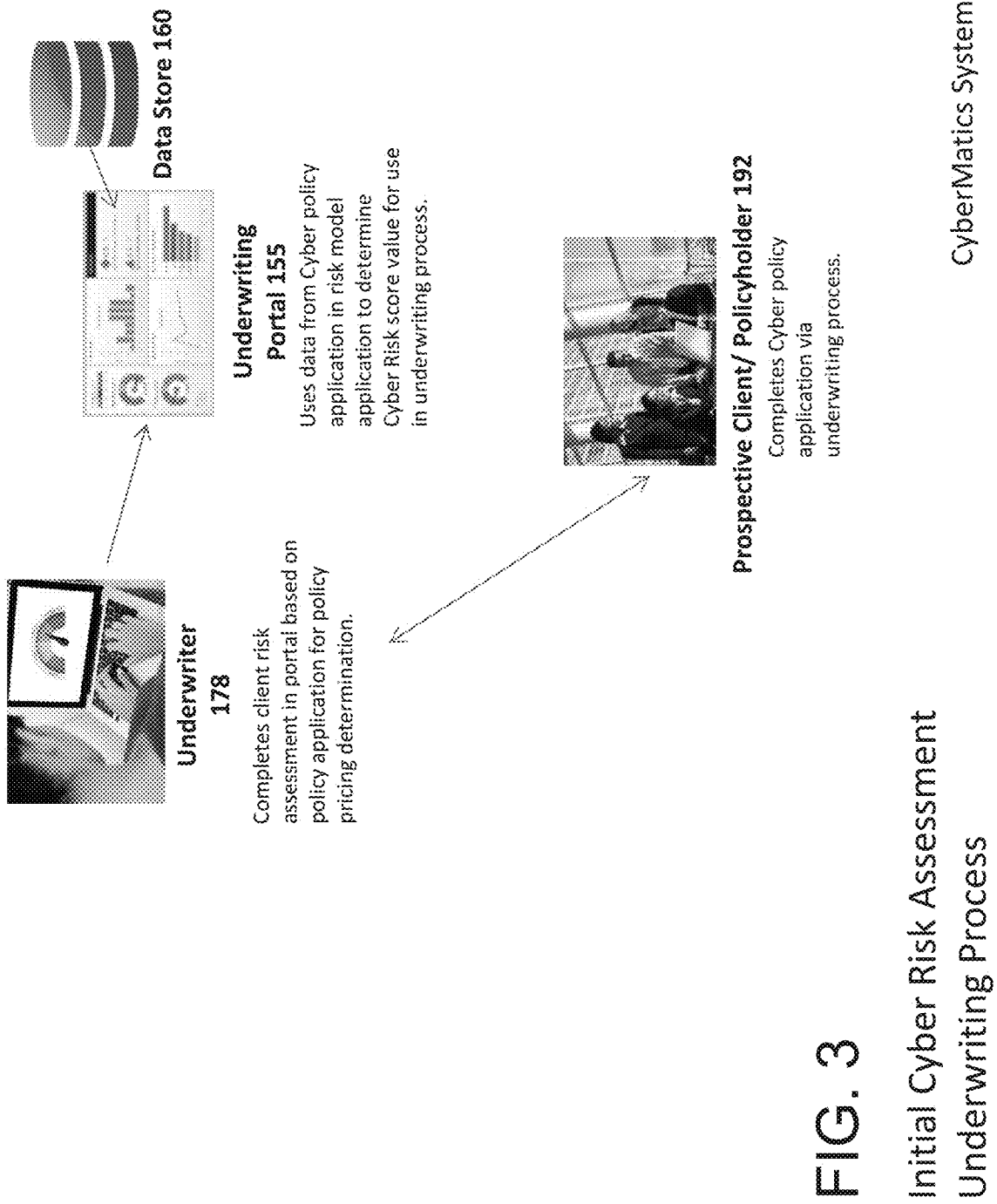
FIG. 3 is another schematic diagram of a method of using a part of the system of FIG. 1 used for preparing an initial cyber risk assessment during an underwriting process for a cyber insurance policy.

Referring to FIG. 3, initially, the CyberMatics system 150 can be used to conduct a risk assessment process via the cyber risk model application. The risk model contains the elements, formulas, and data fields for the initial assessment that is completed during the underwriting process. The CyberMatics system 150 includes the Underwriting Portal 155 to implement and automate the initial application and risk assessment process. The Underwriting Portal 155 comprises an interface to the database back end, which is stored in the data storage device 160 and houses the policyholder risk data based on input from the Policyholder 192 or the Underwriter 178 which can be populated via automated data input feeds. In embodiments, at least one of such data feeds comes from an external source, such as the CyberMatics data feed 195 from the client's computing environment 191 through a suitable API (or a commercially-available program, such as, one from BitSight Technologies of Cambridge, Mass., for example). Other data, such as policyholder analytics on claims, can be provided from an internal source. The Underwriting Portal 155, using the risk model, applies analytics to the data to produce the resulting risk score and areas of deficiency and strength. The Underwriter 178 can view the results via the Underwriting Portal 155 and make policy pricing and limit decisions based on the output. A report can also be shared with the Policyholder 192 to explain determined risk levels and associated pricing.

Figure 4:
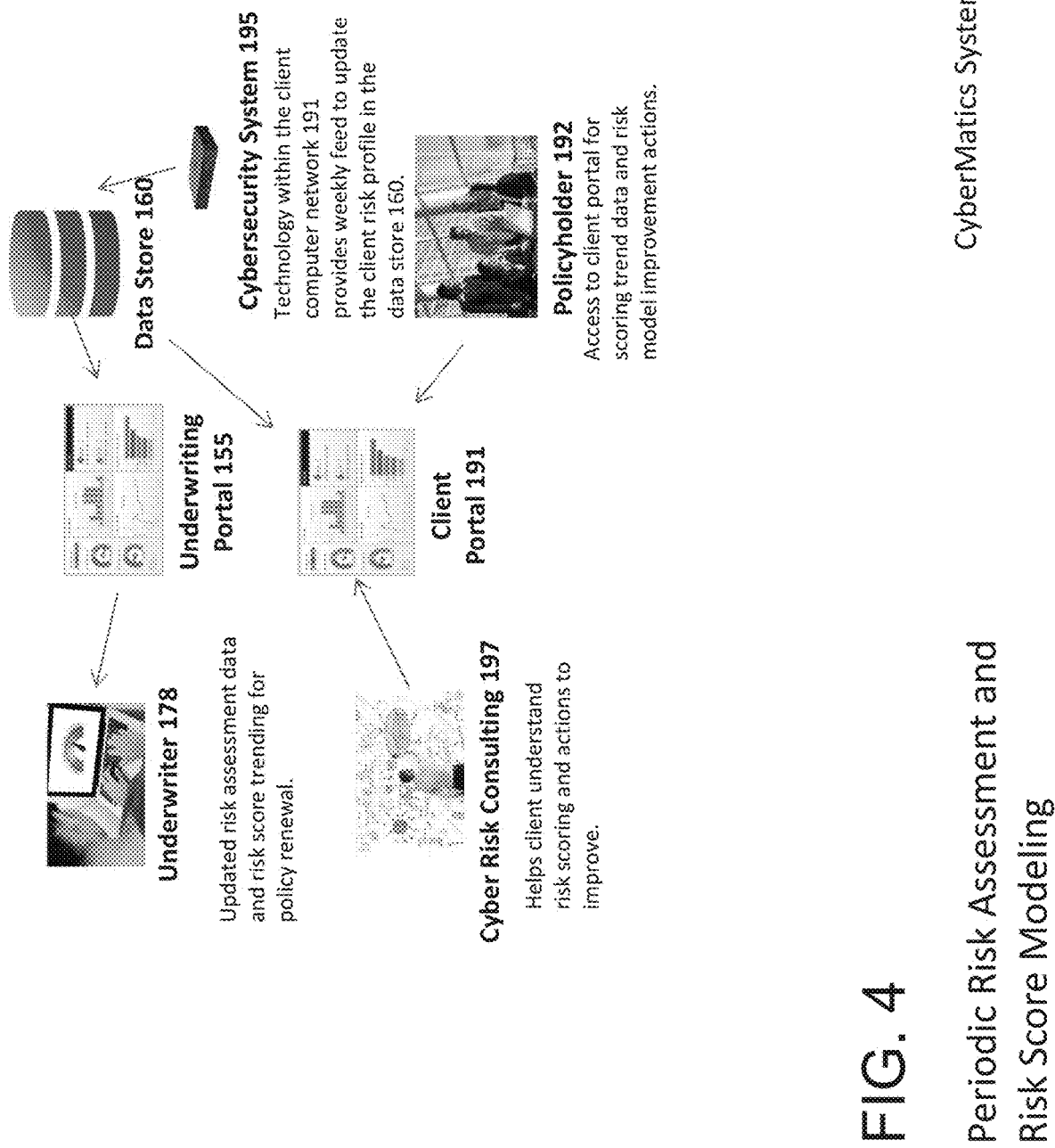
FIG. 4 is another schematic diagram of a method of using a part of the system of FIG. 1 used for periodically conducting a risk assessment and risk score modeling after a cyber insurance policy is issued.

Referring to FIG. 4, the CyberMatics system 150 can be used to perform periodic risk assessment updates to provide an "always on underwriting" function. In other words, the initial risk assessment can be periodically updated (e.g., on a weekly basis) via the risk model and Underwriting Portal 155 throughout the policy period. The CyberMatics system 150 can receive data feeds from the cybersecurity system 195 that exists within the policyholder computing environment 191. With those feeds, the data can be translated and mapped to the risk model via developed APIs and used to update the policyholder risk profile and score stored within the data store for the Underwriting Portal 155. The data store 160 can store past risk model output on a rolling basis (e.g., with a twelve-month look back or a period tied to the length of time of the insured's policy), allowing Underwriters 178, cyber consultants 197, and the Policyholder 192 the ability to observe the policyholder risk score trending over time. When the policy is up for renewal, the Underwriter 178 can use the latest risk assessment and trended scoring data from the Policyholder 192 which can dramatically decrease the policy renewal process. Correspondingly, the Policyholder 192 can also see, via the Client Portal 191, the information that led to their risk score and the affect it had, positively or negatively, on the coverage provided and the price of that coverage.

The CyberMatics system 150 can be adapted to help the Policyholder 192 understand and model risk improvement actions based on the resulting output of the risk model. The Policyholder 192 can interact with the CyberMatics system 150 via the Client Portal 191 to understand how they can receive the desired incentives at policy renewal. In other words, the Client Portal 191 can display information concerning what actions the Policyholder 192 could take to improve the cyber security risk score and receive a better rate or other incentives.

With the new Underwriting Portal 155 and process, the Policyholder 192 can receive a report at the end of the process, similar to a credit report, via the Client Portal. The report can be configured to show them their score and key areas in which they have higher risk that is affecting their score negatively. This report can provide an opportunity to review with the Policyholder 192 the areas of increased risk to understand better the actions they can take to improve them. In embodiments, the CyberMatics system 150 can be configured to automatically generate such a policyholder report on a periodic basis (e.g., every month) over the policy period and have the opportunity for this type of a review with a Cyber Risk Consultant 197. In embodiments, the report can be available in the graphical user interface of the Client Portal 191 and sent via a suitable communication channel, such as via email, for example.

In embodiments, the Client Portal 191 is connected to the data store 160. In embodiments, the Client Portal 191 can provide a different, yet similar view, to what the Policyholder 192 can view see in the periodic report. In the Client Portal 191, the Policyholder 192 can be able to see their risk score, how it is trending over time, and areas of their risk profile that are higher risk and affecting their score negatively.

In embodiments, the Client Portal 191 can also provide a risk modeling capability in which the Policyholder 192 can see a list of recommended improvement actions. As they review the list of actions they can take to improve, they can model and see how, if implemented, those actions would positively affect their overall score. Based on experience in cyber consulting, clients often will invest thousands of dollars in third party cyber consulting teams to assess and provide recommendations to them on how to improve their security programs. However, clients do not always take action on their investment and the recommendations provided from a third party. The primary reason for this is the difficulty a third party has in demonstrating the quantified business impact the identified risks pose to the business. As the Policyholder 192 understands its score and actions it can take to improve, the Policyholder 192 can also understand that an improved risk score can lead to better rates or other incentives. In other words, the Client Portal 191 can help the Policyholder 192 realize how to improve and effect positive change during the policy period and prior to policy renewal.

Figure 5:
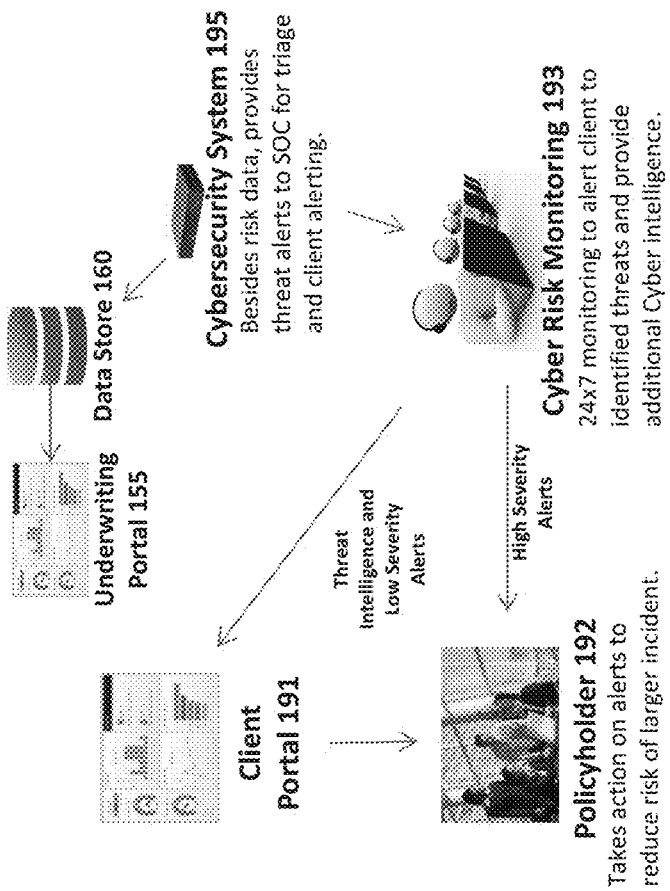
FIG. 5 is another schematic diagram of a method of using a part of the system of FIG. 1 used for monitoring the policy holder's computer network for cybersecurity threats after a cyber insurance policy is issued.

Referring to FIG. 5, the CyberMatics system 150 can include a cyber risk monitoring function to help partner with the Policyholder 192 to decrease the cyber risk exposure to their business by providing threat monitoring services. The CyberMatics system 150 can be adapted to alert the Policyholder 192 to a threat that may lead to a larger incident and help them take action to prevent it.

In embodiments, the threat alerting services can be offered in two forms, active or passive monitoring. In passive monitoring, the CyberMatics system 150 receives threat alerts from the policyholder computing environment 191, via the cybersecurity system installed in the policyholder's computer network 191, triages the alert for validity, and, if valid, alerts the Policyholder 192 for the need to take action based on a pre-agreed severity level notification process. In active monitoring, the Policyholder 192 provides permission for the CyberMatics system 150 to take action on the valid alert to block or thwart the threat and its attempt to negatively affect the policyholder's computing environment 191. The CyberMatics system 150 can include suitable computer hardware and programming configured to perform passive threat monitoring and/or active threat monitoring of the client computer network 191, as will be appreciated by those skilled in the art.

In embodiments, threat alerting can also take place in the form of provided intelligence to the Client Portal 191. Based on active research on potential threats, or active incidents that may be occurring with other Policyholders, a Security Operations Center (SOC) module of the security risk program 152 of the cybersecurity processor 158 of the CyberMatics system 150 can be adapted to provide alerting and regular intelligence feeds to the Client Portal 191. In embodiments, an alert can be sent to the Policyholder 192 to take action before the threat reaches the policyholder's computing environment 191.

In embodiments, the CyberMatics program can be segmented into a variety of service tiers from which the Policyholder 192 chooses. An exemplary schedule of tiers for the CyberMatics program is found in Table I.

TABLE I

| CyberMatics Service Tiers | Service Elements |
|---|---|
| Tier 1 - Continuous Risk Assessment | Flexible Technology Implementation<br>Continuous Risk Assessment towards<br>Access to Client Portal for Risk Scoring and improvement<br>Possible incentives for improved risk scores at renewal |

TABLE I-continued

| CyberMatics Service Tiers | Service Elements |
|---|---|
| Tier 2 - Passive Threat Monitoring and Intelligence | All Tier 1 service elements<br>24 × 7 Passive Threat Monitoring<br>Alerts on valid threats based on pre-defined severity model<br>General cyber threat intelligence feed via Client Portal |
| Tier 3 - Active Threat Response | All Tier 1& Tier 2 service elements<br>Pre-defined access to take certain action to block or prevent varying types of threats |

In the illustrated embodiment, the first tier of service includes only the capability for ongoing risk assessment. The CyberMatics system 150 can be implemented by connecting the regular data feeds from the cybersecurity system 195 within the policyholder computing environment 191 to the data store 160 used by the risk model program. The Policyholder 192 can have access to the Client Portal 191 and be able to see its risk score trending data and access risk modeling and improvement actions. As policy renewal time approaches, the Underwriter 178 can have access to the updated risk scoring and be able to quickly quote renewed policy pricing with possible incentives based on policyholder risk improvement.

The second tier of service adds the next layer or module of service by activating the passive monitoring SOC capability of the CyberMatics system 150. The Policyholder 192 can have the continuous risk assessment, as with the first tier, but also have the advantage of the SOC 193 continuously watching the threat alerts and triaging and alerting on those that are likely to cause an incident. The Policyholder 192 can receive alerts based on predefined severity levels. Low severity alerts can be sent to the Policyholder 192 via their Client Portal 191 access, while high severity alerts can be dealt with by direct communication to the Policyholder 192 key point of contact. In addition, the Policyholder 192 can have the added advantage of security research and threat intelligence feeds sent to their Client Portal 191 by the SOC 193.

The third tier of service includes everything from the first two tiers and adds an active incident response element to the service. The SOC module is given permissions to access the alerting technology and take initial actions within the insured's computing environment 191 during an incident. For example, if a piece of ransomware has infected a system and the SOC 193 receives an alert, the SOC module can quickly triage and take action to quarantine the ransomware before it infects the system, or worse, spreads and infects a larger portion of the network.

In embodiments, the CyberMatics system 150 is compatible with any of a variety of existing technology partners that provide technology adapted to monitor a computing environment and provide threat alerting functions. The CyberMatics system 150 can be outfitted with one or more suitable APIs to allow existing technology in place within the policyholder's computing environment to provide the cyber risk data stream used by the CyberMatics system 150.

For example, the cyber risk data stream is fed to the data store 160 for use by the risk model application to compute a cyber risk score. Which cybersecurity system 195 resides in the policyholder computing environment 191 to provide the periodic data update to that model does not matter to the CyberMatics system 150, and it can be varied. The concept of flexible technology, within the CyberMatics system 150, allows the CyberMatics program to be used with numerous and different computing environments, via an assortment of different application programming interfaces (APIs) to facilitate the mapping of the data collected from the technology to the risk model.

In embodiments, the CyberMatics system 150 is configured such that it does not store any logs or data produced by any technology within the client computing environment 191. In embodiments, the CyberMatics system 150 does not store any type of personal identifiable information (PII), financial, medical, or other critical data records from the client computing environment. In embodiments, the CyberMatics system 150 does not use that type of information to accomplish the continuous assessment process. For example, rather than storing logs for several hundred windows system endpoints, the risk model would simply receive information concerning how many windows systems the policyholder computing environment contains. The API is adapted to poll the logs for the technology within the client computing environment 191 and via analytics produce the answer to that question, then store only the answer to the question and no other client data. In this way, the client maintains all control and storage requirements for system logs, critical records, etc. and the CyberMatics system 150 has no direct access to that data.

In embodiments, the CyberMatics program includes a vetting process that reviews the risk data model against the data collected by the technology in a computing environment to determine whether the technology truly can provide the level of data needed for the continuous risk assessment feed. Then, the technology is tested to verify that the technology performs reliably in identifying and alerting on various types of security threats. Once the technology has been tested, the data mapping and API development occurs. This API can be tested with the technology implemented in a production-like environment to validate the data mapping and feed works correctly for Policyholder use. The technology can then be added to the CyberMatics flexible technology list.

There are many benefits to the operator of the CyberMatics system 150 and the Policyholder 192 by its being flexible in the technology that can be used to implement the program. The Policyholder 192 may not have to implement a new technology to participate in the CyberMatics program, nor will the system operator have to dictate a specific technology. The Policyholder 192 that already has a cybersecurity system 195 implemented, from the list of pre-qualified technologies, can establish a connection for the risk data feed with the API designated for their pre-existing technology. This will result in a much simpler and quicker implementation with little to no cost to the Policyholder 192. With flexible technology use, the operator of the CyberMatics system 150 also has the added benefit of not having to incur the costs to maintain any self-developed technology, nor be restricted to a single technology allowing for improved service program costs for the Policyholder.

Referring to FIG. 6, a schematic view of a series of frames of an embodiment of a graphical user interface suitable for use with a client portal constructed according to principles of the present disclosure is shown. The series of frames includes navigation details through the graphical user interface, including login 210, dynamic dashboard 215, forecast 220, notifications 225, contact cyber risk consultant 230, and export reports 235.

During the policy period, the Policyholder has access to the Client Portal in order to view, for example, information concerning the risk score, areas where improvement may be needed, and suggested actions that can be taken to improve the cyber security risk score and model how the completed action would affect their score. The Client Portal can act as the central point of access and information for the Policyholder to receive the analytics and data generated by the cybersecurity program of the CyberMatics system.

LOGIN 210. In embodiments, the Login feature of the graphical user interface can be configured to provide a secure entry point for the client in order to access the information provided by the cybersecurity risk program of the CyberMatics system via the client portal. In embodiments, credentialed user name and password data can be stored in the data storage device and selectively queried to provide a secure entrance to the client portal. In embodiments, the Login feature of the graphical user interface can include sequences for resetting the client's password and providing security communications via an email associated with the particular client. In embodiments, the login feature can be configured as a one-factor authentication procedure or as a multi-factor authentication procedure, as will be appreciated by one skilled in the art.

DYNAMIC DASHBOARD 215. The information provided in the dynamic dashboard feature of the graphical user interface can include all or some of the same data provided to a client in the Executive Summary Report (ESR) attached as an Appendix hereto. Unlike a snapshot in time report, however, the dynamic dashboard information can be updated on a periodic basis, such as by being updated weekly throughout the policy period by the cybersecurity risk program of the CyberMatics system with updates to the client's cyber risk maturity score, recommendations and other data, and displays the trending cyber model output, including using peer universe data for any given score computed by the cybersecurity program.

Cyber Risk Maturity. In embodiments, the cybersecurity risk program of the CyberMatics system can calculate a value for the cyber risk maturity score by defining a peer universe of other clients falling within a predefined demographic category. For example, in embodiments, factors such as the primary industry, annual revenue, and region for a client can be used to establish a peer group. Those clients that participate in CyberMatics with a like categorization can become part of the peer universe and feed the peer comparisons in the cyber risk maturity scoring. In embodiments, if there are less than a certain number of clients (e.g. ten) in any peer universe, the graphical user interface can be configured to not display the peer data within the dynamic dashboard.

In embodiments, the cybersecurity risk program of the CyberMatics system is configured to calculate the cyber risk maturity score by evaluating a client's cyber security program within the client's computer network against a set of current general cyber threats and vulnerabilities that account for a predetermined percentage of known corporate security breaches and against potential impact of those threat scenarios to the client's operations to generate an implicit risk score. The cybersecurity risk program of the CyberMatics system can evaluate a client's existing security controls and how those reduce the implicit risk to generate a control effectiveness score. The cybersecurity risk program of the CyberMatics system can calculate a residual risk score by determining the difference between the implicit risk score and the control effectiveness score. A client's implicit risk score and residual risk scores are then compared to produce the overall cyber risk maturity score. The lower the score reflected the better the client is doing in protecting their organization against the current threat environment.

In embodiments, the cybersecurity risk program of the CyberMatics system is configured to combine information received from the client's computer network with current threat intelligence received from one or more data streams received through the web server and the potential impact of a cyber breach to score and quantify the applicant's cyber risk. The end result is an overall cyber risk maturity score measured against a set of predetermined different attack patterns and across a set of selected asset groups. The cybersecurity risk program of the CyberMatics system can generate a detailed assessment report, depicting the client's threat profile and resilience in detail, by both attack type and asset class.

In embodiments, the cybersecurity risk program of the CyberMatics system is configured to determine the current range of cyber risk maturity scores for the peer universe of a given client and to calculate where within that range the client falls to provide a peer benchmarking feature.

The client is able to see its cyber risk maturity score relative to the range of scores of its peers and determine visually within the graphical user interface of the client portal if they are at the low or high end of the range with their cyber maturity score when compared to their peers. In embodiments, the cybersecurity risk program of the CyberMatics system is configured to calculate a peer range having endpoints comprising an average high and an average low cyber risk maturity score for the peer universe with a normal range determined therebetween. The cybersecurity risk program is configured to determine an average value of the cyber risk maturity scores for the peer universe and to calculate the client's cyber risk maturity score expressed as a percentage of the average value. In embodiments, the cybersecurity risk program is configured to determine the cyber risk scoring as a snapshot in time or as trending data over time (such as, over a one-year period, for example that can be depicted by the display module of the cybersecurity risk program in the graphical user interface as a trend line.

Implicit Risk. In embodiments, the cybersecurity risk program of the CyberMatics system can calculate a score for the implicit risk of the computer network, which is the risk a client is exposed to, without taking into consideration any prevention measures taken within the client's computer network. In embodiments, the cybersecurity risk program of the CyberMatics system can calculate the implicit risk score as the combination of the current threat environment and impact of those threats to the client's organization without considering the benefit of any existing cybersecurity controls. To develop a client's threat risk score, the cyber model of the cybersecurity risk program can be configured to evaluate a client's cyber security system profile against the general cyber threat environment globally, common vulnerabilities in computing environments, and common threat scenarios that account for a predetermined percentage of known corporate security breaches. Exemplary common threat scenarios include web application attacks, point of sale intrusion, insider and privilege misuse, physical theft and loss, crimeware, and cyber espionage. In embodiments, the graphical user interface can display the underlying threat and business impact scores that make up implicit risk in response to the client selecting a link in the frame of the graphical user interface displaying the implicit risk score.

Control Effectiveness. In embodiments, the cybersecurity risk program of the CyberMatics system can calculate a score for the control effectiveness of the client's computer network, which rates how effective the implemented prevention strategies are to help provide cyber threat preparedness. The control effectiveness score measures the client's current risk mitigating capabilities based on the updated data received from the computer network via the API connecting the cybersecurity risk program of the CyberMatics system to the cybersecurity system installed within the client's computer network.

Residual Risk. In embodiments, the cybersecurity risk program of the CyberMatics system can calculate a score for the residual risk of the client's computer network, which rates the client's risk exposure after control implementation to help identify the cyber risk vulnerabilities that remain. The residual risk score provides the same measure as the implicit risk score but with the benefit of control effectiveness added to the calculation. The cybersecurity risk program can be configured to calculate the difference in the implicit and residual risk scores to determine the cyber risk maturity score.

In embodiments, the cybersecurity risk program can be configured to calculate the scores such that they change by either changes to control questions when the periodic data update (e.g., weekly) is received from the client's computer network or by periodic changes (e.g., monthly) in the cyber threat environment received from other data sources. Control question changes are affected by changes within the client's computer network. Cyber threat environment changes are affected through consistent review of ongoing claims and security intelligence sources that result in updates to the threat data in the cyber model.

Risk Index Per Threat Category. In embodiments, the cybersecurity risk program of the CyberMatics system can calculate a score for the how the client's risk index compares with the expected value for each risk category, helping diagnose areas of vulnerability.

Prioritized Control Recommendations. In embodiments, the cybersecurity risk program of the CyberMatics system can determine the controls that would most help the client's risk posture and the relative effectiveness of each. In embodiments, the cybersecurity risk program can be configured to select a set of controls (from a larger set of predetermined techniques) to help reduce the client's risk exposure, based on the client's particular characteristics of its computer network and/or its areas that would suffer the greatest impact from a cyber attack.

The cybersecurity risk program can be configured to compare implicit cyber risk to a client's current cyber security program or existing cyber controls. The model output is configured to identify controls that could further mitigate existing risk and improve a client's cyber risk maturity score. The prioritized practices table lists, in recommended order, those controls (from a set of predetermined controls that are not implemented in the computer network) that can most improve a client's cyber risk maturity score (e.g. a top five list). In embodiments, the set of predetermined controls can comprise controls that correspond to the controls published by the Center for Internet Security (CIS) of East Greenbush, N.Y., as the Critical Security Controls for Effective Cyber Defense. In embodiments, the set of predetermined controls can comprise controls that correspond to the controls published on Mar. 19, 2018, by the CIS in "CIS Controls," Version 7, the contents of which are incorporated herein by this reference. In embodiments, the graphical user interface can display a greater range of the top prioritized control recommendations by clicking a link in the frame of the graphical user interface displaying the prioritized control recommendations.

Top Risk Scenarios. In embodiments, the cybersecurity risk program of the CyberMatics system can display in the graphical user interface potential areas of cybersecurity attack and the exposure the client has for each type of attack based upon client data stored within the data storage device. The cybersecurity risk program can be configured to assess a client's computer network operational characteristics as provided periodically through the API against a current set of common cyber threat scenarios. Based on risk model output and cyber control effectiveness, the cybersecurity risk program can be configured to determine what cyber threat scenarios are more likely to impact the client. Exemplary common threat scenarios include web application attacks, point of sale intrusion, insider and privilege misuse, physical theft and loss, crimeware, and cyber espionage.

Data Breach and Interruption (DoS). In embodiments, the cybersecurity risk program of the CyberMatics system can calculate a score for the monetary effect of data breaches and lost business due to service interruption.

FORECAST 220. In embodiments, the Notifications feature of the graphical user interface can be configured to generate a new forecast by selecting a link displayed in the graphical user interface. In response to selecting the link, the cybersecurity risk program can launch a forecasting window in the graphical user interface that includes parameter data fields to enter the user's desired forecast configuration.

In embodiments, the forecasting feature of the cybersecurity risk program allows the client to see how the risk and cyber risk maturity scores would change based on changes in control effectiveness. In other words, it provides the ability to ask, "How would implementing a prioritized practice change the score?" A client using this feature can better determine which controls would provide the most return in cyber risk maturity resulting in a better score and better premium.

NOTIFICATIONS 225. In embodiments, the Notifications feature of the graphical user interface can be configured to provide a client with the ability to customize the manner in which the cybersecurity risk program of the CyberMatics system communicates with the client via the client portal. A notifications menu can be launched to view new notifications and view details for each notification sent by the cybersecurity risk program, ranging from significant score changes to new data availability to system updates, for example. In embodiments, the Notifications feature of the graphical user interface can include options to dismiss the notification, view additional details, or launch a notification summary page that features all of the active notifications sent by the cybersecurity risk program. In embodiments, the notifications in the summary page can be listed by title, date, and type, and can be filtered by one or more of such categories. In embodiments, the Notifications feature of the graphical user interface can include personalization settings that can be selected by a user to configure how the notifications are transmitted by the cybersecurity risk program.

CONTACT CYBER RISK CONSULTANT 230. In embodiments, the graphical user interface can be configured to include a "Contact Risk Consultant" link in one or more frames of the graphical user interface. Clicking the contact link launches a window having a help request form that can be completed by the client to ask for consultation assistance.

EXPORT REPORTS 235. In embodiments, the Export Reports feature of the graphical user interface can be configured to export data generated by the cybersecurity risk program 152 using the graphical user interface.

Referring to FIG. 7, an embodiment of a graphical user interface suitable for use in a Client Portal constructed according to principles of the present disclosure is shown. In the illustrated embodiment, the page 250 of the Client Portal includes dashboard details determined by a cybersecurity risk program of the CyberMatics system, including: a cyber risk score 251 computed based upon the cyber risk data stream received from the client computer network, a residual risk grid 252, a listing 253 of risk scenarios, graphs relating to breach probability 254, breach impact 255, denial of service probability 256, and denial of service impact 257.

In embodiments, in addition to the risk modeling and scoring data, the Client Portal can include general threat intelligence reports in the portal. The general intelligence reports can be constructed to warn of potential events that are affecting Policyholders within their industry and provide actions they can take to avoid the same. It may also include other general cybersecurity noteworthy news items.

FIG. 8 depicts another schematic diagram of a part of an embodiment of a system 350 for assessing cybersecurity risk of a computer network which is constructed according to principles of the present disclosure. The system 350 of FIG. 8 can be used for monitoring the policy holder's computer network for cybersecurity threats after a cyber insurance policy is issued. The system 350 of FIG. 8 comprises a cloud-based storage architecture.

Referring to FIG. 9, there is shown an embodiment of a method for assessing cybersecurity risk of a computer network following principles of the present disclosure. The process to implement CyberMatics for a client that has elected to participate in the program is fairly simple, especially if the client has technology already installed in their computing environment that is on the CyberMatics flexible technology list. A Cyber Risk Consulting team can interface with the client, orient them to the CyberMatics process, and ensure the implementation process is completed successfully. In the illustrated embodiment, the CyberMatics process includes the steps of underwriting, policy binding, implementing CyberMatics, conducting ongoing CyberMatics evaluations, and renewing the policy.

Underwriting/Initial Risk Assessment. The CyberMatics system can include an Underwriting Portal to implement and automate the initial application and risk assessment process. The risk assessment process can include the use of the risk model of the CyberMatics system. The completed initial risk assessment, as part of the underwriting process, begins and feeds directly into the CyberMatics process.

As an initial matter, the Policyholder elects to participate in the CyberMatics process as part of the initial assessment for the rest of the process to take effect. In other words, all cyber policyholders can have the initial risk assessment completed, but it may be that not all Policyholders participate in the CyberMatics process. During the underwriting process, the option to participate in the CyberMatics process can be given to the Policyholder and the program explained.

In embodiments, the Policyholder can be given an incentive to participate in the CyberMatics Program. An exemplary list of incentives is found in Table II below. In embodiments, one or more of the listed incentives can be offered for a given policy.

TABLE II

| CyberMatics Incentive | Incentive Elements |
| --- | --- |
| Reduced Retention | If a policyholder enrolls in the CyberMatics program, they become eligible for a reduced retention rate for selected coverages. |
| Limit Multiplier | A policyholder enrolled in the CyberMatics program is eligible for increased coverage limits with improved risk scores. |

TABLE II-continued

| CyberMatics Incentive | Incentive Elements |
| --- | --- |
| No Claim Bonus | No claims during the policy period will result in a refund of a predetermined percentage of the paid premium returned to the policyholder. |
| Claim Forgiveness | If enrolled in the CyberMatics program, a policyholder that has a claim of specific type and less than a predetermined amount will not have a premium increase at renewal. |
| AIG Consulting Services Voucher | If enrolled in the CyberMatics program, a policyholder receives a monetary voucher to be applied to Cyber Risk Consulting services. |

Policy Binding and Initial CyberMatics Orientation. When the CyberMatics system receives notification from the Underwriter of a new Policyholder that has elected to participate in CyberMatics program, a consultant can be automatically assigned to reach out to the Policyholder's key point of contact, e.g., the Chief Risk Officer, for introduction, to establish a date and time for the CyberMatics orientation meeting. An orientation meeting checklist can be generated by the CyberMatics system and provided to the Policyholder key point of contact after this call to help them prepare for orientation. In embodiments, the orientation meeting is completed within the first two weeks of the policy binding date. The purpose of the orientation is to introduce the member of the Cyber Risk Consulting team that will be facilitating the implementation of the CyberMatics program for the Policyholder, gather key data, and to provide an overview of the steps to complete that process.

If the Policyholder has elected to participate in Tiers 2 or 3 of the CyberMatics program, the Cyber Risk Consultant can contact the SOC key point of contact informing them of a new Policyholder and inviting them to the orientation call. The AIG consultant then conducts the policyholder orientation meeting on the designated date and time. The orientation meeting can include a review of the following topics: overview of the CyberMatics program; SOC monitoring and alerting overview, if applicable; review of policyholder computing environment and existing security technology; and review of the CyberMatics implementation process and timeline (generated by the CyberMatics system). In embodiments, the Cyber Risk Consultant can provide a copy of the time line and associated actions and decisions as a meeting summary to the Policyholder's key point of contact after the meeting is concluded.

If the Policyholder has a security technology already in their computing environment from the flexible technology list, the Cyber Risk Consultant can proceed to the CyberMatics implementation. If not, the Cyber Risk Consultant can work with the Policyholder to select a partner from the list and facilitate the process for the Policyholder to purchase and implement the selected technology from the list. Once completed, the Cyber Risk Consultant can then proceed to the implementation.

CyberMatics Implementation. A suitable API is selected for download, installation, and connection to the central data store. Once completed, the cyber risk data feed through the API from the technology of the policyholder's computing environment is tested and validated to confirm the data feed is working correctly and as expected. Once the data feed is implemented and working correctly, access to the Client Portal is made to show the Policyholder how to access their regular risk scoring information and understand how to view and model different risk improvement actions.

At this point, if the Policyholder has only elected to participate in Tier 1 of the CyberMatics program, the implementation process is complete. However, if the Policyholder has elected to participate in Tiers 2 or 3 of the program, the connectivity and implementation of the policyholder cybersecurity system 195 to the SOC module of the CyberMatics system 150 is established. This part of the implementation can be run in parallel to the implementation of the data feed.

To implement the Tier 2 or Tier 3 service levels of the CyberMatics program, the Policyholder connects the flexible technology of its computing environment, via technology applicable APIs, to a web-based platform of the SOC module via a suitable API. In embodiments, the platform is adapted to include an initial data aggregation tool that will receive the alert data feed from the policyholder's computing environment and parse and distribute appropriate levels of alerting for SOC interaction to an alert evaluation platform, which can include an analyst dashboard for an operator to interact with the alert data feed to help discern validity of any incoming alerts and take appropriate actions. The diagram shown in FIG. 6 illustrates an embodiment of a computer architecture for the Tier 2 or Tier 3 CyberMatics levels of service.

Once tested and verified that the threat alert data feed is connected, the SOC module is adapted to review and verify alerting severity levels, notification processes, and conduct testing to ensure the Policyholder is able to review low severity alerts via the Client Portal and that the high severity alert process is working correctly. In embodiments, a Cyber Risk Consultant can also have access to the information from the threat alert data feed via a SOC Analyst dashboard to validate that security threat intelligence feeds are active and visible to the Policyholder in the Client Portal. The flowchart shown in FIGS. 7A-7C illustrates exemplary steps of an embodiment of a method of implementing a method of assessing cybersecurity risk of a computer network following principles of the present disclosure Ongoing Use of the CyberMatics Process during the Policy Period. In embodiments, the CyberMatics system can be fully implemented within the first sixty days of the cyber policy period. During the remaining time of the policy period, the CyberMatics process can include active tasks and follow up with the Policyholder to help ensure the CyberMatics program is helping the Policyholder decrease cyber risk.

In embodiments, the CyberMatics process includes the step of periodically generating risk scoring trend data of the Policyholder. In embodiments, the CyberMatics system is adapted to generate the risk scoring trend data on a monthly basis and automatically send the trend data to the Policyholder via the client portal. Whether the score is trending positive or negatively, a summary report can be provided to the Policyholder's designated point of contact. If the risk score is trending downward, the risk model data can be analyzed to determine causes for the negative trend. In embodiments, an assistance message can be generated that includes recommending and connecting the Policyholder with available partner services. If trending in the positive direction, an encouragement message can be generated that includes recommendations in the Client Portal for continued improvement and, in some embodiments, additional incentives at policy renewal.

If the Policyholder is participating in Tiers 2 or 3 of the CyberMatics program, ongoing monitoring and alerting of the policyholder computing environment is continuous during the policy period. The SOC module of the CyberMatics program can act to ensure that the monitoring service and associated security intelligence feeds and incident alerts are provided to the Policyholder in response to detecting a triggering event.

In the event of an alert, the SOC module is adapted to analyze and determine the validity of the alert. If the alert is valid and a security incident is taking place, the SOC module is adapted to determine the severity of the incident and begin the policyholder notification process. In embodiments, the SOC module generates a notification comprising an alert via the Client Portal, or a telephonic message via a suitable automatic telephone unit to the designated point of contact for the Policyholder. If the Policyholder is participating in Tier 3, the SOC module can be adapted to take initial action to block or assist with the threat and then provide the necessary intelligence and information surrounding the alert so the Policyholder can take action.

Another advantage to having the monitoring capability of the CyberMatics process is the ecosystem intelligence that can help provide an early warning to Policyholders not yet experiencing a particular security event. As the SOC module receives an indication of incidents of a particular type affecting one or more Policyholders in general, or in a specific industry, the SOC module can be used to diagnose and provide intelligence to other CyberMatics Policyholders to help them take preventative steps prior to any incident occurring in their computing environment. This may take the form of a message item in the security intelligence feed through the Client Portal and/or by direct message to the designated point of contact for the policy holder.

Policy Renewal. When a cyber policy comes within a predetermined period of its expiration date (e.g., within thirty to sixty days of expiration), the CyberMatics system can be adapted to generate a renewal message to a designated Underwriter and the Policyholder. The Underwriter, who is responsible for working with the Policyholder and broker for policy renewal, can login to the Underwriting Portal. In embodiments, the data store will retain a rolling period (e.g., twelve month or the policy period) of the policyholder risk score data. The Underwriting Portal can be adapted to provide the Underwriter with the most current risk score and risk assessment data as well as the scoring trends of the designated rolling period. If the scoring is trending negatively, the Underwriter may wish to consult with Cyber Risk Consultants to understand what actions have or may be underway to reverse the trend. If there are any incident claims, they can also review that data and consult with the Policyholder and/or the Cyber Risk Consultants to understand further the cause and actions that are being addressed. Once the Underwriter has completed their assessment of the current risk score and posture, they can determine what incentives may be offered with the renewing policy and discuss those with the Policyholder.

Assuming the policy is renewed, the CyberMatics process can continue, without the need to repeat the implementation phase, unless the Policyholder has elected to increase their level of participation in the CyberMatics program. In that case, a Cyber Risk Consultant can be notified via the CyberMatics system to coordinate with the Policyholder to implement the added changes to the Policyholder's CyberMatics program.

FIGS. 10A-10C depict a flowchart illustrating steps of an embodiment of a method for implementing a method of assessing cybersecurity risk of a computer network following principles of the present disclosure. In other embodiments, other suitable implementation methods can be used that include these and/or other steps, as will be appreciated by one skilled in the art.

In embodiments of a method of assessing cybersecurity risk of a computer network following principles of the present disclosure, a system constructed according to principles of the present disclosure can be used to carry out the method. In embodiments, a method of assessing cybersecurity risk of a computer network following principles of the present disclosure includes employing a processor to execute computer executable instructions stored on a tangible computer-readable medium to perform a step of periodically updating a value of a cybersecurity risk parameter during a policy period where the value of the cybersecurity risk parameter is on a scale indicative of a cybersecurity risk level of the computer network at a given time.

An embodiment of a method of assessing cybersecurity risk of a computer network, which has a cybersecurity risk parameter with a first value on a scale indicative of a cybersecurity risk level of the computer network at a first time, includes employing a processor to execute a cybersecurity risk program having computer-executable instructions stored on a non-transitory computer-readable medium. The cybersecurity risk program causes the processor to perform a number of steps.

Input data associated with the computer network is received at a second time. The second time is different from the first time. The input data corresponds to operational characteristics of the computer network at the second time.

The operational characteristics of the computer network are analyzed using a risk model to determine a second value of the cybersecurity risk parameter at the second time. The risk model includes a number of data fields configured to determine a value on the scale indicative of the cybersecurity risk level of the computer network. At least one operational characteristic of the computer network from the input data is used in at least one data field of the risk model. The second value of the cybersecurity risk parameter at the second time is transmitted to a client portal for display in a graphical user interface.

In embodiments, the method further includes a cybersecurity risk program having computer-executable instructions that cause the processor to perform further steps, including receiving input data associated with, and corresponding to operational characteristics of, the computer network the computer network at a third time. The third time is different from both the first time and the second time. The operational characteristics of the computer network are analyzed at the third time using the risk model to determine a third value of the cybersecurity risk parameter at the third time. Risk score trend data of the computer network are generated based upon at least two of the first value, the second value, and the third value. The risk score trend data are transmitted to the client portal for display in the graphical user interface.

In embodiments of a method of assessing cybersecurity risk of a computer network following principles of the present disclosure, the method can include forecasting a value for the cybersecurity risk parameter based upon a selection made through the client portal. In embodiments, a cybersecurity risk program can include computer-executable instructions that cause the processor, in response to receiving a forecast request from the client portal for at least one of a set of cybersecurity controls not present within the computer network, to analyze the operational characteristics of the computer network at the second time modified by assuming said at least one of the set of cybersecurity controls not present within the computer network is implemented in the computer network using the risk model to determine a forecasted value of the cybersecurity risk parameter. The cybersecurity risk program can be configured to transmit the forecasted value of the cybersecurity risk parameter to the client portal for display in the graphical user interface.

In embodiments of a method of assessing cybersecurity risk of a computer network following principles of the present disclosure, the risk model includes a threat likelihood module, a business impact module, and a control effectiveness module. The operational characteristics of the computer network are analyzed using the risk model to determine a residual risk score. The residual risk score is based upon a control effectiveness value from the control effectiveness module being deducted from a product of a threat likelihood value from the threat likelihood module and a business impact value from the business impact module. In embodiments, the business impact module is configured to calculate the business impact value based upon asset data associated with an operational configuration of the computer network.

In embodiments of a method of assessing cybersecurity risk of a computer network following principles of the present disclosure, the input data associated with the computer network at the second time is received via a data feed from a cybersecurity system installed within the computer network. In embodiments, the input data associated with the computer network at the second time is received via an application program interface (API) connected to the cybersecurity system installed within the computer network. In embodiments, the input data received via the API is generated by the API polling logs of the cybersecurity system within the computer network to produce the input data in a form that does not contain data produced within the computer network. In embodiments, the input data comprise a yes or no value for a data field of the risk model.

In embodiments, the cybersecurity risk program can be configured to conduct passive or active cybersecurity monitoring of the computer network. In embodiments, the computer-executable instructions of the cybersecurity risk program can be configured to cause the processor, in response to receiving an alert input concerning a cybersecurity threat, to transmit a threat alert message concerning the cybersecurity threat to the client portal for display in the graphical user interface independent of whether the cybersecurity threat is detected within the computer network.

In embodiments, the cybersecurity risk program is configured to conduct passive cybersecurity monitoring in which it sends an alert in response to detecting a cybersecurity threat. In one embodiment, the computer-executable instructions of the cybersecurity risk program further cause the processor to monitor the data feed from the cybersecurity system installed within the computer network for a valid threat alert. The cybersecurity risk program can be configured, in response to receiving the valid threat alert, to transmit an alert message to the client portal for display in the graphical user interface.

In embodiments, the cybersecurity risk program is configured to conduct active cybersecurity monitoring in which, in response to detecting a cybersecurity threat, it modifies the computer network to increase its resilience to the detected threat. In one embodiment, the computer-executable instructions of the cybersecurity risk program further cause the processor to monitor the data feed from the cybersecurity system installed within the computer network for a valid threat alert. In response to receiving the valid threat alert, the cybersecurity risk program can be configured to actively modify the computer network by implementing a protective measure configured to reduce the threat.

In embodiments of a method of assessing cybersecurity risk of a computer network following principles of the present disclosure, the cybersecurity risk program is configured to determine at least one cybersecurity control that is not implemented within the computer network and to present information within the graphical user interface suggesting that identifies the unimplemented control. In embodiments, the cybersecurity risk program is configured to determine the unimplemented cybersecurity control based upon its determination of which one of a set of unimplemented controls would most impact at least one of the threat likelihood score, the value of the cybersecurity risk parameter, and the residual risk. In one embodiment, the cybersecurity risk program is configured to select a cybersecurity control from a set of cybersecurity controls not present within the computer network. The selected cybersecurity control is determined by calculating a relative effectiveness value for each of the set of cybersecurity controls and identifying the highest relative effectiveness value. Data concerning the selected cybersecurity control are transmitted to the client portal for display in the graphical user interface.

In an embodiment following principles of the present disclosure of a method of monitoring cybersecurity risk of a computer network, which has a cybersecurity risk parameter with a first value on a scale indicative of a cybersecurity risk level of the computer network at a first time, includes actively monitoring the computer network via a cybersecurity system installed within the computer network. The cybersecurity system is configured to generate operational data relating to the computer network at a second time which is different from the first time.

A processor is employed to execute a cybersecurity risk program including computer-executable instructions stored on a non-transitory computer-readable medium causing the processor to perform steps. The operational data of the computer network is analyzed to determine input data corresponding to operational characteristics of the computer network. The input data is transmitted to a risk model configured to determine a second value of the cybersecurity risk parameter at the second time. The risk model includes a number of data fields configured to determine a value on a scale indicative of the cybersecurity risk level of the computer network. At least one operational characteristic of the computer network from the input data is used in at least one data field of the risk model.

In embodiments, the input data associated with the computer network at the second time is transmitted via an application program interface (API) connected to the cybersecurity system installed within the computer network. In embodiments, the input data is determined by polling logs of the cybersecurity system within the computer network to produce the input data in a form that does not contain data produced within the computer network. In embodiments, the input data comprises a yes or no value for a data field of the risk model.

In embodiments of a method of monitoring cybersecurity risk of a computer network following principles of the present disclosure, the computer-executable instructions of the cybersecurity risk program can cause the processor to transmit a data feed from the cybersecurity system installed within the computer network. The data feed is configured to be used to determine whether a valid cybersecurity threat pertains to the computer network.

CyberMatics connects to cybersecurity technology within an insured's computer environment to regularly pull verified answers to the questions answered when first applying for cyber insurance. This process helps provide continual feedback on the cyber risk posture of the computer network. Cyber Risk Consultants can help a client act on the cybersecurity risk scoring and prioritized practices determined by the cybersecurity risk program 152 and evaluate data for system vulnerabilities and negative risk trends.

Data can be supplied to the cybersecurity risk program 152 via API according to a predetermined schedule, such as, on a weekly basis, e.g., for an updated pull of answers to the cyber application questions. The connection can only occur when the periodic update is performed and no client data beyond a yes/no answer to the question need be transmitted outside of the client's computer network. Once the updated data pull is complete, the cybersecurity risk program 152 evaluates the client's cyber security maturity against a set of common attack patterns across a predetermined assortment of commonly used technology devices. The model incorporates security data, such as, current threat intelligence from multiple sources, effectiveness of an organization's cyber controls, and the potential impact of a cyber breach on the organization, and empirical data concerning prior cyber claims occurring in the past. The client can view cyber security maturity scores, prioritized practices, and other information via the client portal.

The cybersecurity risk program 152 can provide prioritized recommendations to improve scores and evaluate the data for system vulnerabilities and negative trends. A clients can see the impact a change make to the computer network through modifications in risk scoring throughout the policy period. A client can also use the forecasting feature of the cybersecurity risk program 152 to determine the effect on the risk score making one or more changes that were recommended would make without having to implement them first. As the threat environment changes and as the client implements changes, the cybersecurity risk program 152 can provide re-ordered prioritized recommendations to reflect the changing cyber environment within which the computer network operates.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:
  receiving, by a processor, input data associated with a computer network at a second time, the second time being different from the first time, the input data corresponding to operational characteristics of the computer network at the second time, the computer network having a cybersecurity risk parameter with a first value on a scale indicative of a cybersecurity risk level of the computer network at a first time;
  analyzing, by the processor, the operational characteristics of the computer network using a risk model to determine a second value of the cybersecurity risk parameter at the second time, the risk model including a number of data fields configured to determine a value on the scale indicative of the cybersecurity risk level of the computer network, at least one of the operational characteristics of the computer network from the input data being used in at least one data field of the risk model; and
  in response to receiving a forecast request from a client portal for a set of cybersecurity controls not present within the computer network, analyzing, by the processor, the operational characteristics of the computer network at the second time modified by assuming the set of cybersecurity controls not present within the computer network is implemented in the computer network using the risk model to determine a forecasted value of the cybersecurity risk parameter for the client portal.

2. The method of claim 1, further comprising:
  receiving, by the processor, the input data associated with, and corresponding to the operational characteristics of, the computer network at a third time, the third time being different from both the first time and the second time,
  analyzing, by the processor, the operational characteristics of the computer network at the third time using the risk model to determine a third value of the cybersecurity risk parameter at the third time,
  generating, by the processor, risk score trend data of the computer network based upon at least two of the first value, the second value, and the third value, and
  transmitting, by the processor, the risk score trend data to the client portal.

3. The method of claim 1, further comprising transmitting, by the processor, the second value of the cybersecurity risk parameter at the second time to the client portal.

4. The method of claim 1, wherein the risk model includes a threat likelihood module, a business impact module, and a control effectiveness module, and wherein the operational characteristics of the computer network are analyzed using the risk model to determine a residual risk score, the residual risk score being based upon a control effectiveness value from the control effectiveness module being deducted from a product of a threat likelihood value from the threat likelihood module and a business impact value from the business impact module.

5. The method of claim 4, wherein the business impact module calculates the business impact value based upon asset data associated with an operational configuration of the computer network.

6. The method of claim 1, wherein the input data associated with the computer network at the second time is received via a data feed from a cybersecurity system installed within the computer network.

7. The method of claim 6, further comprising monitoring, by the processor, the data feed from the cybersecurity system installed within the computer network for a valid threat alert, and, in response to receiving the valid threat alert, transmitting an alert message to the client portal.

8. The method of claim 6, further comprising monitoring, by the processor, the data feed from the cybersecurity system installed within the computer network for a valid threat alert, and, in response to receiving the valid threat alert, actively modifying the computer network by implementing a protective measure configured to reduce the threat.

9. The method of claim 6, further comprising, in response to receiving an alert input concerning a cybersecurity threat, transmitting, by the processor, a threat alert message concerning the cybersecurity threat to the client portal independent of whether the cybersecurity threat is detected within the computer network.

10. The method of claim 6, further comprising selecting, by the processor, a cybersecurity control from a set of cybersecurity controls not present within the computer network, the selected cybersecurity control determined by calculating a relative effectiveness value for each of the set of cybersecurity controls and identifying the highest relative effectiveness value and transmitting data concerning the selected cybersecurity control to the client portal.

11. The method of claim 1, further comprising transmitting, by the processor, the forecasted value of the cybersecurity risk parameter to the client portal.

12. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, input data associated with a computer network at a second time, the second time being different from the first time, the input data corresponding to operational characteristics of the computer network at the second time, the computer network having a cybersecurity risk parameter with a first value on a scale indicative of a cybersecurity risk level of the computer network at a first time;
analyzing, by the processor, operational characteristics of the computer network at the second time using a risk model to determine a second value of the cybersecurity risk parameter at the second time, the risk model including a number of data fields configured to determine a value on the scale indicative of the cybersecurity risk level of the computer network, at least one of the operational characteristics of the computer network from the input data being used in at least one data field of the risk model; and
in response to receiving a forecast request from a client portal for a set of cybersecurity controls not present within the computer network, analyzing, by the processor, the operational characteristics of the computer network at the second time modified by assuming the set of cybersecurity controls not present within the computer network is implemented in the computer network using the risk model to determine a forecasted value of the cybersecurity risk parameter for the client portal.

13. The system of claim 12, further comprising transmitting, by the processor, the second value of the cybersecurity risk parameter at the second time to the client portal.

14. The system of claim 12, further comprising analyzing, by the processor, the operational characteristics of the computer network using the risk model to determine a residual risk score, the residual risk score being based upon a control effectiveness value being deducted from a product of a threat likelihood value and a business impact value.

15. The system of claim 14, further comprising calculating, by the processor, the business impact value based upon asset data from the data storage device, the asset data associated with an operational configuration of the computer network.

16. The system of claim 12, further comprising monitoring, by the processor, a data feed received from a cybersecurity system installed within the computer network for a valid threat alert, and in response to receiving the valid threat alert, transmitting an alert message via the web-enabled interface to the client portal.

17. The system of claim 12, further comprising monitoring, by the processor, a data feed received from a cybersecurity system installed within the computer network for a valid threat alert, and, in response to receiving the valid threat alert, actively modifying the computer network by implementing a protective measure configured to reduce the threat.

18. The system of claim 12, further comprising selecting, by the processor, a cybersecurity control from a set of cybersecurity controls not present within the computer network, the selected cybersecurity control determined by calculating a relative effectiveness value for each of the set of cybersecurity controls and identifying the highest relative effectiveness value, and transmitting data concerning the selected cybersecurity control to the client portal.

19. A method comprising:
actively monitoring, by a processor, a computer network via a cybersecurity system installed within the computer network, the cybersecurity system configured to generate operational data relating to the computer network at a second time, the second time being different from the first time, the computer network having a cybersecurity risk parameter with a first value on a scale indicative of a cybersecurity risk level of the computer network at a first time;
analyzing, by the processor, the operational data of the computer network to determine input data corresponding to operational characteristics of the computer network;
transmitting, by the processor, the input data to a risk model configured to determine a second value of the cybersecurity risk parameter at the second time, the risk model including a number of data fields configured to determine a value on a scale indicative of the cybersecurity risk level of the computer network, at least one of the operational characteristics of the computer network from the input data being used in a data field of the risk model; and in response to receiving a forecast request from a client portal for a set of cybersecurity controls not present within the computer network, analyzing, by the processor, the operational characteristics of the computer network at the second time modified by assuming the set of cybersecurity controls not present within the computer network is implemented in the computer network using the risk model to determine a forecasted value of the cybersecurity risk parameter for the client portal.

20. The method of claim 19, further comprising transmitting, by the processor, a data feed from the cybersecurity system installed within the computer network, the data feed configured to be used to determine whether a valid cybersecurity threat pertains to the computer network.

* * * * *